United States Patent
Loiseau et al.

(10) Patent No.: US 9,850,423 B2
(45) Date of Patent: Dec. 26, 2017

(54) HYDROLYZABLE PARTICLE COMPOSITIONS, TREATMENT FLUIDS AND METHODS

(71) Applicant: SCHLUMBERGER TECHNOLOGY CORPORATION, Sugar Land, TX (US)

(72) Inventors: Anthony Loiseau, Rio de Janeiro (BR); Yiyan Chen, Sugar Land, TX (US); Mohan K. R. Panga, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 394 days.

(21) Appl. No.: 14/357,758

(22) PCT Filed: Nov. 6, 2012

(86) PCT No.: PCT/US2012/063681
§ 371 (c)(1),
(2) Date: May 12, 2014

(87) PCT Pub. No.: WO2013/070585
PCT Pub. Date: May 16, 2013

(65) Prior Publication Data
US 2014/0326452 A1 Nov. 6, 2014

Related U.S. Application Data

(63) Continuation of application No. 13/294,297, filed on Nov. 11, 2011, now Pat. No. 9,040,468.

(51) Int. Cl.
*C09K 8/80* (2006.01)
*E21B 43/04* (2006.01)
(Continued)

(52) U.S. Cl.
CPC .............. *C09K 8/805* (2013.01); *C09K 8/516* (2013.01); *C09K 8/70* (2013.01); *C09K 8/80* (2013.01);
(Continued)

(58) Field of Classification Search
None
See application file for complete search history.

(56) References Cited

U.S. PATENT DOCUMENTS

| 2,193,775 A | 3/1940 | Stratford |
| 2,277,543 A | 3/1942 | Downs |

(Continued)

FOREIGN PATENT DOCUMENTS

| CA | 2593607 A1 | 7/2006 |
| CA | 2710988 A1 | 7/2009 |

(Continued)

OTHER PUBLICATIONS

Office Action issued in Chinese Patent Application No. 201280066881.6 on Mar. 4, 2016; 20 pages (w/ English translation).
(Continued)

*Primary Examiner* — John J Figueroa
(74) *Attorney, Agent, or Firm* — Andrea E. Tran

(57) ABSTRACT

A composition, treatment fluid and method using hydrolyzable fines. A treatment fluid, which may optionally include a high solids content fluid (HSCF) and/or an Apollonianistic solids mixture, includes a fluid loss control agent comprising a dispersion of hydrolyzable fines, optionally with one or more of a surfactant, plasticizer, dispersant, degradable particles, reactive particles and/or submicron particles selected from silicates, γ-alumina, MgO, γ-Fe2O3, TiO2, and combinations thereof.

10 Claims, 4 Drawing Sheets

(51) Int. Cl.
   *E21B 43/267*   (2006.01)
   *C09K 8/82*   (2006.01)
   *C09K 8/70*   (2006.01)
   *C09K 8/516*   (2006.01)

(52) U.S. Cl.
   CPC ............... *C09K 8/82* (2013.01); *E21B 43/04* (2013.01); *E21B 43/267* (2013.01); *C09K 2208/10* (2013.01); *C09K 2208/18* (2013.01)

(56) References Cited

U.S. PATENT DOCUMENTS

| | | |
|---|---|---|
| 2,513,944 A | 7/1950 | Kessler |
| RE24,570 E | 11/1958 | Mangold et al. |
| 2,905,245 A | 9/1959 | Priester |
| 3,362,475 A | 1/1968 | Huitt |
| 3,434,540 A | 3/1969 | Stein |
| 3,675,717 A | 7/1972 | Goins et al. |
| 3,711,405 A | 1/1973 | Pye |
| 3,815,680 A | 6/1974 | McGuire et al. |
| 3,851,709 A | 12/1974 | Fitch et al. |
| 3,887,474 A | 6/1975 | Senfe et al. |
| 3,922,173 A | 11/1975 | Misak |
| 3,937,283 A | 2/1976 | Blauer et al. |
| 4,051,900 A | 10/1977 | Hankins |
| 4,107,057 A | 8/1978 | Dill et al. |
| 4,143,715 A | 3/1979 | Pavlich |
| 4,233,165 A | 11/1980 | Salathiel et al. |
| 4,387,769 A | 6/1983 | Erbstoesser et al. |
| 4,456,067 A | 6/1984 | Pinner, Jr. |
| 4,506,734 A | 3/1985 | Nolte |
| 4,509,598 A | 4/1985 | Earl et al. |
| 4,526,695 A | 7/1985 | Erbstoesser et al. |
| 4,537,918 A | 8/1985 | Parcevaux et al. |
| 4,579,668 A | 4/1986 | Messenger |
| 4,606,407 A | 8/1986 | Shu |
| 4,652,257 A | 3/1987 | Chang |
| 4,652,441 A | 3/1987 | Okada et al. |
| 4,665,988 A | 5/1987 | Murphey et al. |
| 4,670,166 A | 6/1987 | McDougall et al. |
| 4,718,490 A | 1/1988 | Uhri |
| 4,738,897 A | 4/1988 | McDougall et al. |
| 4,785,884 A | 11/1988 | Armbruster |
| 4,809,783 A | 3/1989 | Hollenbeck et al. |
| 4,846,277 A | 7/1989 | Khalil et al. |
| 4,848,467 A | 7/1989 | Cantu et al. |
| 4,867,241 A | 9/1989 | Strubhar |
| 4,883,124 A | 11/1989 | Jennings, Jr. |
| 4,917,185 A | 4/1990 | Jennings, Jr. et al. |
| 4,951,751 A | 8/1990 | Jennings, Jr. |
| 4,957,165 A | 9/1990 | Cantu et al. |
| 4,968,353 A | 11/1990 | Kawasaki et al. |
| 4,968,354 A | 11/1990 | Nishiura et al. |
| 4,977,961 A | 12/1990 | Avasthi |
| 4,986,353 A | 1/1991 | Clark et al. |
| 4,986,355 A | 1/1991 | Casad et al. |
| 5,009,267 A | 4/1991 | Williamson et al. |
| 5,036,920 A | 8/1991 | Corvette et al. |
| 5,041,516 A | 8/1991 | Frechet et al. |
| 5,046,562 A | 9/1991 | Crema et al. |
| 5,080,170 A | 1/1992 | Whitebay et al. |
| 5,095,987 A | 3/1992 | Weaver et al. |
| 5,110,486 A | 5/1992 | Manalastas et al. |
| 5,161,618 A | 11/1992 | Jones et al. |
| 5,188,837 A | 2/1993 | Domb |
| 5,213,160 A | 5/1993 | Nahm et al. |
| 5,227,422 A | 7/1993 | Mitsuji et al. |
| 5,238,065 A | 8/1993 | Mondshine et al. |
| 5,238,067 A | 8/1993 | Jennings, Jr. |
| 5,318,382 A | 6/1994 | Cahill |
| 5,325,921 A | 7/1994 | Johnson et al. |
| 5,330,005 A | 7/1994 | Card et al. |
| 5,332,037 A | 7/1994 | Schmidt et al. |
| 5,333,689 A | 8/1994 | Jones et al. |
| 5,381,864 A | 1/1995 | Nguyen et al. |
| 5,415,228 A | 5/1995 | Price et al. |
| 5,435,391 A | 7/1995 | Jones |
| 5,439,055 A | 8/1995 | Card et al. |
| 5,447,199 A | 9/1995 | Dawson et al. |
| 5,492,178 A | 2/1996 | Nguyen et al. |
| 5,501,274 A | 3/1996 | Nguyen et al. |
| 5,501,275 A | 3/1996 | Card et al. |
| 5,507,342 A | 4/1996 | Copeland et al. |
| 5,518,996 A | 5/1996 | Maroy et al. |
| 5,551,516 A | 9/1996 | Norman et al. |
| 5,604,186 A | 2/1997 | Hunt et al. |
| 5,629,271 A | 5/1997 | Dobson et al. |
| 5,713,416 A | 2/1998 | Chatterji et al. |
| 5,741,758 A | 4/1998 | Pakulski |
| 5,783,527 A | 7/1998 | Dobson, Jr. et al. |
| 5,893,416 A | 4/1999 | Read |
| 5,905,468 A | 5/1999 | Ikawa et al. |
| 5,908,073 A | 6/1999 | Nguyen et al. |
| 5,922,652 A | 7/1999 | Kowalski et al. |
| 5,934,376 A | 8/1999 | Nguyen et al. |
| 5,964,291 A | 10/1999 | Bourne et al. |
| 5,979,557 A | 11/1999 | Card et al. |
| 6,059,034 A | 5/2000 | Rickards et al. |
| 6,069,118 A | 5/2000 | Hinkel et al. |
| 6,114,410 A | 9/2000 | Betzold |
| 6,138,760 A | 10/2000 | Lopez et al. |
| 6,153,562 A | 11/2000 | Villar et al. |
| 6,156,805 A | 12/2000 | Smith et al. |
| 6,169,058 B1 | 1/2001 | Le et al. |
| 6,171,386 B1 | 1/2001 | Sabins |
| 6,172,011 B1 | 1/2001 | Card et al. |
| 6,176,307 B1 | 1/2001 | Danos et al. |
| 6,192,985 B1 | 2/2001 | Hinkel et al. |
| 6,209,643 B1 | 4/2001 | Nguyen et al. |
| 6,209,646 B1 | 4/2001 | Reddy et al. |
| 6,234,251 B1 | 5/2001 | Chatterji et al. |
| 6,239,183 B1 | 5/2001 | Farmer et al. |
| 6,258,859 B1 | 7/2001 | Dahayanake et al. |
| 6,271,181 B1 | 8/2001 | Chatterji et al. |
| 6,279,656 B1 | 8/2001 | Sinclair et al. |
| 6,302,207 B1 | 10/2001 | Nguyen et al. |
| 6,306,800 B1 | 10/2001 | Samuel et al. |
| 6,326,335 B1 | 12/2001 | Kowalski et al. |
| 6,328,105 B1 | 12/2001 | Betzold |
| 6,330,916 B1 | 12/2001 | Rickards et al. |
| 6,364,020 B1 | 4/2002 | Crawshaw et al. |
| 6,379,865 B1 | 4/2002 | Mao et al. |
| 6,380,136 B1 | 4/2002 | Bates et al. |
| 6,412,561 B1 | 7/2002 | Brown et al. |
| 6,435,277 B1 | 8/2002 | Qu et al. |
| 6,439,309 B1 | 8/2002 | Matherly et al. |
| 6,446,722 B2 | 9/2002 | Nguyen et al. |
| 6,448,206 B1 | 9/2002 | Griffith et al. |
| 6,464,009 B2 | 10/2002 | Bland et al. |
| 6,482,517 B1 | 11/2002 | Anderson |
| 6,506,710 B1 | 1/2003 | Hoey et al. |
| 6,543,538 B2 | 4/2003 | Tolman et al. |
| 6,555,507 B2 | 4/2003 | Chatterji et al. |
| 6,559,245 B2 | 5/2003 | Mao et al. |
| 6,599,863 B1 | 7/2003 | Palmer et al. |
| 6,626,991 B1 | 9/2003 | Drochon et al. |
| 6,637,517 B2 | 10/2003 | Samuel et al. |
| 6,656,265 B1 | 12/2003 | Garnier et al. |
| 6,703,351 B2 | 3/2004 | Stowe, II et al. |
| 6,703,352 B2 | 3/2004 | Dahayanake et al. |
| 6,719,054 B2 | 4/2004 | Cheng et al. |
| 6,723,683 B2 | 4/2004 | Crossman et al. |
| 6,725,930 B2 | 4/2004 | Boney et al. |
| 6,742,590 B1 | 6/2004 | Nguyen |
| 6,776,235 B1 | 8/2004 | England |
| 6,818,594 B1 | 11/2004 | Freeman et al. |
| 6,823,940 B2 | 11/2004 | Reddy et al. |
| 6,828,280 B2 | 12/2004 | England et al. |
| 6,860,328 B2 | 3/2005 | Gonzalez et al. |
| 6,874,578 B1 | 4/2005 | Garnier et al. |
| 6,877,560 B2 | 4/2005 | Nguyen et al. |
| 6,935,426 B1 | 8/2005 | Rainbolt et al. |
| 6,938,693 B2 | 9/2005 | Boney et al. |
| 6,949,491 B2 | 9/2005 | Cooke, Jr. |

(56) References Cited

U.S. PATENT DOCUMENTS

| | | |
|---|---|---|
| 6,989,195 B2 | 1/2006 | Anderson |
| 7,004,255 B2 | 2/2006 | Boney |
| 7,007,754 B2 | 3/2006 | Fanguy, Jr. et al. |
| 7,013,995 B2 | 3/2006 | Crawshaw et al. |
| 7,028,775 B2 | 4/2006 | Fu et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,060,661 B2 | 6/2006 | Dobson, Sr. et al. |
| 7,066,260 B2 | 6/2006 | Sullivan et al. |
| 7,116,560 B2 | 10/2006 | Chou et al. |
| 7,135,231 B1 | 11/2006 | Sinclair et al. |
| 7,148,184 B2 | 12/2006 | Francini et al. |
| 7,148,185 B2 | 12/2006 | Fu et al. |
| 7,178,596 B2 | 2/2007 | Blauch et al. |
| 7,195,068 B2 | 3/2007 | Todd |
| 7,196,040 B2 | 3/2007 | Heath et al. |
| 7,213,651 B2 | 5/2007 | Brannon et al. |
| 7,216,705 B2 | 5/2007 | Saini et al. |
| 7,237,610 B1 | 7/2007 | Saini et al. |
| 7,261,157 B2 | 8/2007 | Nguyen et al. |
| 7,265,079 B2 | 9/2007 | Willberg et al. |
| 7,267,170 B2 | 9/2007 | Mang et al. |
| 7,267,174 B2 | 9/2007 | Gonsveld et al. |
| 7,275,596 B2 | 10/2007 | Willberg et al. |
| 7,290,615 B2 | 11/2007 | Christanti et al. |
| 7,294,347 B2 | 11/2007 | Menjoge et al. |
| 7,299,875 B2 | 11/2007 | Nguyen et al. |
| 7,303,018 B2 | 12/2007 | Cawiezel et al. |
| 7,334,635 B2 | 2/2008 | Nguyen |
| 7,337,839 B2 | 3/2008 | Ayoub et al. |
| 7,345,012 B2 | 3/2008 | Chen et al. |
| 7,373,991 B2 | 5/2008 | Vaidya et al. |
| 7,398,826 B2 | 7/2008 | Hoefer et al. |
| 7,398,829 B2 | 7/2008 | Hutchins et al. |
| 7,405,183 B2 | 7/2008 | Hanes, Jr. |
| 7,419,937 B2 | 9/2008 | Rimmer et al. |
| 7,451,812 B2 | 11/2008 | Cooper et al. |
| 7,482,311 B2 | 1/2009 | Willberg et al. |
| 7,493,955 B2 | 2/2009 | Gupta et al. |
| 7,494,957 B2 | 2/2009 | Pena et al. |
| 7,510,009 B2 | 3/2009 | Cawiezel et al. |
| 7,528,096 B2 | 5/2009 | Brannon et al. |
| 7,543,640 B2 | 6/2009 | Macdougall |
| 7,559,369 B2 | 7/2009 | Roddy et al. |
| 7,565,929 B2 | 7/2009 | Bustos et al. |
| 7,569,522 B2 | 8/2009 | Pena et al. |
| 7,571,767 B2 | 8/2009 | Parker et al. |
| 7,581,590 B2 | 9/2009 | Lesko et al. |
| 7,624,802 B2 | 12/2009 | McCrary et al. |
| 7,644,761 B1 | 1/2010 | Gu et al. |
| 7,655,603 B2 | 2/2010 | Crews |
| 7,678,745 B2 | 3/2010 | Parris et al. |
| 7,703,531 B2 | 4/2010 | Huang et al. |
| 7,740,068 B2 | 6/2010 | Ballard |
| 7,775,282 B2 | 8/2010 | Hutchins et al. |
| 7,779,915 B2 | 8/2010 | Hutchins et al. |
| 7,784,541 B2 | 8/2010 | Hartman et al. |
| 7,789,145 B2 * | 9/2010 | Patel ............... E21B 34/06 166/227 |
| 7,789,146 B2 | 9/2010 | Panga et al. |
| 7,806,182 B2 | 10/2010 | Waters et al. |
| 7,833,947 B1 | 11/2010 | Kubala |
| 7,857,048 B2 | 12/2010 | Daniel et al. |
| 7,923,415 B2 | 4/2011 | Panga et al. |
| 7,931,088 B2 | 4/2011 | Stegemoeller et al. |
| 7,954,548 B2 | 6/2011 | Curimbaba et al. |
| 7,971,644 B2 | 7/2011 | Ladva et al. |
| 7,973,991 B2 | 7/2011 | Watanabe |
| 8,042,614 B2 | 10/2011 | Sullivan et al. |
| 8,066,058 B2 | 11/2011 | Daniel et al. |
| 8,119,574 B2 | 2/2012 | Panga et al. |
| 8,167,043 B2 | 5/2012 | Willberg et al. |
| 8,168,570 B2 | 5/2012 | Barron et al. |
| 8,186,438 B2 | 5/2012 | Ali et al. |
| 8,227,026 B2 | 7/2012 | McDaniel et al. |
| 8,230,925 B2 | 7/2012 | Willberg et al. |
| 8,234,072 B2 | 7/2012 | Smith, Jr. et al. |
| 8,281,857 B2 | 10/2012 | Willberg et al. |
| 8,490,698 B2 | 7/2013 | Panga et al. |
| 8,490,699 B2 | 7/2013 | Panga et al. |
| 9,145,513 B2 | 9/2015 | Pershikova et al. |
| 9,238,772 B2 | 1/2016 | Panga et al. |
| 2002/0023752 A1 | 2/2002 | Qu et al. |
| 2002/0185278 A1 | 12/2002 | Brown et al. |
| 2003/0002195 A1 | 1/2003 | Sassolini et al. |
| 2003/0006037 A1 | 1/2003 | Brothers et al. |
| 2003/0051662 A1 | 3/2003 | Lee et al. |
| 2003/0134751 A1 | 7/2003 | Lee et al. |
| 2004/0022861 A1 | 2/2004 | Williams, III et al. |
| 2004/0045893 A1 | 3/2004 | Watanabe et al. |
| 2004/0060702 A1 | 4/2004 | Kotlar et al. |
| 2004/0074646 A1 | 4/2004 | Kotlar et al. |
| 2004/0094300 A1 * | 5/2004 | Sullivan ............... C09K 8/52 166/308.1 |
| 2004/0106525 A1 | 6/2004 | Willberg et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0006089 A1 | 1/2005 | Justus et al. |
| 2005/0027499 A1 | 2/2005 | Bourbiaux et al. |
| 2005/0037928 A1 | 2/2005 | Qu et al. |
| 2005/0065037 A1 | 3/2005 | Constien |
| 2005/0080176 A1 | 4/2005 | Robb |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0155762 A1 | 7/2005 | Chen et al. |
| 2005/0160945 A1 | 7/2005 | Barlet-Gouedard et al. |
| 2005/0161220 A1 | 7/2005 | Todd et al. |
| 2005/0172699 A1 | 8/2005 | Hu et al. |
| 2005/0233895 A1 | 10/2005 | Mertens et al. |
| 2005/0252651 A1 | 11/2005 | Bosma et al. |
| 2005/0252659 A1 * | 11/2005 | Sullivan ............... C09K 8/506 166/280.1 |
| 2005/0257932 A1 | 11/2005 | Davidson et al. |
| 2006/0006539 A1 | 1/2006 | Matsui et al. |
| 2006/0032636 A1 | 2/2006 | Lord et al. |
| 2006/0041060 A1 | 2/2006 | George et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |
| 2006/0058197 A1 | 3/2006 | Brown et al. |
| 2006/0065397 A1 | 3/2006 | Nguyen et al. |
| 2006/0073980 A1 | 4/2006 | Brannon et al. |
| 2006/0078682 A1 | 4/2006 | McDaniel et al. |
| 2006/0102344 A1 | 5/2006 | Surjaatmadja et al. |
| 2006/0113077 A1 | 6/2006 | Willberg et al. |
| 2006/0113078 A1 | 6/2006 | Nguyen et al. |
| 2006/0144595 A1 | 7/2006 | Milligan et al. |
| 2006/0151173 A1 | 7/2006 | Slabaugh et al. |
| 2006/0169450 A1 | 8/2006 | Mang et al. |
| 2006/0172894 A1 | 8/2006 | Mang et al. |
| 2006/0175059 A1 | 8/2006 | Sinclair et al. |
| 2006/0185848 A1 | 8/2006 | Surjaatmadja et al. |
| 2006/0205605 A1 | 9/2006 | Dessinges et al. |
| 2006/0289160 A1 | 12/2006 | van Batenburg et al. |
| 2007/0017675 A1 | 1/2007 | Hammami et al. |
| 2007/0029086 A1 | 2/2007 | East |
| 2007/0039733 A1 | 2/2007 | Welton et al. |
| 2007/0042912 A1 | 2/2007 | Welton et al. |
| 2007/0125276 A1 | 6/2007 | Reddy et al. |
| 2007/0238622 A1 | 10/2007 | Fu et al. |
| 2007/0238623 A1 | 10/2007 | Saini et al. |
| 2007/0298977 A1 | 12/2007 | Mang et al. |
| 2008/0000391 A1 | 1/2008 | Drochon |
| 2008/0000638 A1 | 1/2008 | Burukhin et al. |
| 2008/0026062 A1 | 1/2008 | Farr et al. |
| 2008/0026955 A1 | 1/2008 | Munoz et al. |
| 2008/0027157 A1 | 1/2008 | Munoz et al. |
| 2008/0053657 A1 | 3/2008 | Alary et al. |

(56) References Cited

U.S. PATENT DOCUMENTS

| | | |
|---|---|---|
| 2008/0060812 A1 | 3/2008 | Huang et al. |
| 2008/0066910 A1 | 3/2008 | Alary et al. |
| 2008/0103065 A1 | 5/2008 | Reddy et al. |
| 2008/0108520 A1 | 5/2008 | Fu et al. |
| 2008/0121395 A1 | 5/2008 | Reddy et al. |
| 2008/0128131 A1 | 6/2008 | Nguyen et al. |
| 2008/0135250 A1 | 6/2008 | Bosma et al. |
| 2008/0139416 A1 | 6/2008 | Rimassa et al. |
| 2008/0142222 A1 | 6/2008 | Howard et al. |
| 2008/0166804 A1 | 7/2008 | Shamblott et al. |
| 2008/0182762 A1 | 7/2008 | Huang et al. |
| 2008/0196896 A1 | 8/2008 | Bustos et al. |
| 2008/0200352 A1 | 8/2008 | Willberg et al. |
| 2008/0202744 A1 | 8/2008 | Crews et al. |
| 2008/0210423 A1 | 9/2008 | Boney |
| 2008/0217012 A1 | 9/2008 | Delorey et al. |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1* | 1/2009 | Panga .................. C09K 8/80 166/278 |
| 2009/0025933 A1 | 1/2009 | Garcia-Lopez de Victoria et al. |
| 2009/0176665 A1 | 7/2009 | Mang et al. |
| 2009/0197780 A1 | 8/2009 | Weaver et al. |
| 2009/0205824 A1 | 8/2009 | Sullivan et al. |
| 2009/0253596 A1 | 10/2009 | Huang et al. |
| 2009/0294126 A1 | 12/2009 | Dalrymple et al. |
| 2009/0301725 A1 | 12/2009 | Case et al. |
| 2010/0000735 A1 | 1/2010 | Weaver et al. |
| 2010/0004146 A1 | 1/2010 | Panga et al. |
| 2010/0065271 A1 | 3/2010 | McCrary et al. |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1 | 5/2010 | Cornelissen et al. |
| 2010/0155372 A1 | 6/2010 | Battisti et al. |
| 2010/0163225 A1 | 7/2010 | Abad et al. |
| 2010/0196277 A1 | 8/2010 | DeSimone et al. |
| 2010/0200247 A1 | 8/2010 | Dybevik et al. |
| 2010/0252259 A1 | 10/2010 | Horton |
| 2010/0323932 A1 | 12/2010 | Bustos et al. |
| 2011/0005760 A1 | 1/2011 | Hartman et al. |
| 2011/0030958 A1 | 2/2011 | Fedorov et al. |
| 2011/0036577 A1 | 2/2011 | Barmatov et al. |
| 2011/0083849 A1 | 4/2011 | Medvedev et al. |
| 2011/0098202 A1 | 4/2011 | James et al. |
| 2011/0114313 A1 | 5/2011 | Lesko et al. |
| 2011/0120713 A1 | 5/2011 | Todd et al. |
| 2011/0155371 A1 | 6/2011 | Panga et al. |
| 2011/0198089 A1 | 8/2011 | Panga et al. |
| 2011/0204533 A1 | 8/2011 | Winchester et al. |
| 2011/0247812 A1 | 10/2011 | Panga et al. |
| 2011/0312857 A1 | 12/2011 | Amanullah et al. |
| 2012/0000641 A1 | 1/2012 | Panga et al. |
| 2012/0000651 A1 | 1/2012 | Panga et al. |
| 2012/0000653 A1 | 1/2012 | Panga et al. |
| 2012/0048549 A1* | 3/2012 | Willberg .................. C09K 8/68 166/279 |
| 2012/0067581 A1 | 3/2012 | Auzerais et al. |
| 2012/0111563 A1 | 5/2012 | Abad et al. |
| 2012/0125617 A1 | 5/2012 | Gu et al. |
| 2012/0132421 A1 | 5/2012 | Loiseau et al. |
| 2012/0138296 A1 | 6/2012 | Panga et al. |
| 2012/0190598 A1 | 7/2012 | McCubbins, Jr. et al. |
| 2012/0247764 A1 | 10/2012 | Panga et al. |
| 2012/0285694 A1 | 11/2012 | Morvan et al. |
| 2012/0305245 A1 | 12/2012 | Loiseau et al. |
| 2012/0305247 A1 | 12/2012 | Chen et al. |
| 2012/0305254 A1 | 12/2012 | Chen et al. |
| 2013/0233542 A1 | 9/2013 | Shampine et al. |
| 2013/0319667 A1 | 12/2013 | Chen |
| 2013/0324444 A1 | 12/2013 | Lesko et al. |
| 2014/0034320 A1 | 2/2014 | Ladva et al. |
| 2014/0131040 A9 | 5/2014 | Panga et al. |

FOREIGN PATENT DOCUMENTS

| | | |
|---|---|---|
| CN | 1863984 A | 11/2006 |
| CN | 103173003 A | 6/2013 |
| EP | 0368395 A1 | 5/1990 |
| EP | 1236701 A1 | 9/2002 |
| GB | 1575507 | 9/1980 |
| GB | 2277543 A | 11/1994 |
| GB | 2277927 A | 11/1994 |
| RU | 2065442 C1 | 8/1996 |
| RU | 2221130 C1 | 1/2004 |
| RU | 2376451 C1 | 12/2009 |
| SU | 1559116 A1 | 4/1990 |
| SU | 1745891 A1 | 7/1992 |
| WO | 9930249 A1 | 6/1999 |
| WO | 0196707 A1 | 12/2001 |
| WO | 03087010 A1 | 10/2003 |
| WO | 03106809 A1 | 12/2003 |
| WO | 2004007904 A1 | 1/2004 |
| WO | 2004038176 A1 | 5/2004 |
| WO | 2006055304 A2 | 5/2006 |
| WO | 2006082359 A1 | 8/2006 |
| WO | 2006106287 A1 | 10/2006 |
| WO | 2007033489 A2 | 3/2007 |
| WO | 2007063317 A1 | 6/2007 |
| WO | 2007086771 A1 | 8/2007 |
| WO | 2007126318 A1 | 11/2007 |
| WO | 2008117222 A1 | 10/2008 |
| WO | 2009045877 A1 | 4/2009 |
| WO | 2009046980 A1 | 4/2009 |
| WO | 2009088317 A1 | 7/2009 |
| WO | 2009106796 A1 | 9/2009 |
| WO | 2009141749 A2 | 11/2009 |
| WO | 2010117457 A2 | 10/2010 |
| WO | 2010117547 A1 | 10/2010 |
| WO | 2011002285 A1 | 1/2011 |
| WO | 2011050046 A1 | 4/2011 |
| WO | 2011143055 A1 | 11/2011 |
| WO | 2013085412 A1 | 6/2013 |

OTHER PUBLICATIONS

International Search Report issued in PCT/US2012/063681 on Mar. 29, 2013, 4 pages.
Office Action issued in Chinese Patent Application No. 201280066881.6 on Nov. 7, 2016; 19 pages (with English translation).
Kirk-Othmer Encyclopedia of Chemical Technology, "Petroleum (Drilling Fluids)", vol. 17, pp. 143-167 (1982).
Kirk-Othmer Enclyclopedia of Chemical Technology, "Cyanamides" vol. 7, pp. 297-299 (1965).
SPE 131783—Less Sand May Not be Enough, M. Curry, T. Maloney, R. Woodroff, and R. Leonard, Feb. 23-25, 2010, SPR Unconventional Gas Conference, Pittsburg, PA, USA, 14 pages.
ARMA/USRMS 05-780—Experiments and numerical simulation of hydraulic fracturing in naturally fractured rock, C.J. De Pater and L.J.L. Beugelsdijk, Jun. 25-29, 2010, The 40th U.S. Symposium of Rock Mechanics (USRMS), Anchorage, AK, USA, 12 pages.
Nolte, K.G.: "Application of Fracture Design Based on Pressure Analysis," SPE13393—SPE Production Engineering, vol. 3, No. 1, pp. 31-42, Feb. 1988.
Nolte, K.G. and Smith, M.B.: "Interpretation of Fracturing Pressures,"—SPE8297—JPT, vol. 12, No. 8, pp. 1767-1775, Sep. 1981.
Smith, M.B., Miller II, W.K., and Haga, J.: "Tip Screenout Fracturing: A Technique for Soft, Unstable Formations," SPE13273—SPE Production Engineering, vol. 2, No. 2, pp. 95-103, May 1987.
Asgian, M.I., Cundall, P.A., and Brady, B.H. (1995) "Mechanical Stability of Porpped Hydraulic Fractures: A Numerical Study",—SPE28510—JPT, pp. 203-208, Mar. 1995.
Milton-Tayler, D., Stephenson, C., and Asgian, M. (1992) "Factors Affecting the Stability of Proppant in Propped Fractures: Results of

(56) References Cited

OTHER PUBLICATIONS a Laboratory Study," paper SPE 24821 presented at the SPE Annual Technical Conference and Exhibition, Washington, DC, Oct. 4-7, pp. 569-579.
Thiercelin et al. (1993) On the Modeling of Near Tip Processes in Hydraulic Fractures. International journal of rock mechanics and mining sciences & geomechanics abstracts, 30(7): p. 1127-1134.
Desroches, J., et al. (1994) The Crack Tip Region in Hydraulic Fracturing. Proc. R. Soc. Lond. A, 447: p. 39-48.
Schlumberger CemCRETE Brochure (2003), 3 pages.
Schlumberger Cementing Services and Products—Materials, pp. 39-76 (2012).
SPE 119366—Fracture Design Considerations in Horizontal Wells Drilled in Unconventional Gas Reservoirs; Cipolla C.L., Lolon, E.P., Mayerhofer, M.J., and Warpinski, N.R. (2009), 10 pages.
Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).
Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).
Economides M.J. and Nolte K.G., Reservoir Stimulation, John Wiley and Sons, Ltd, 3rd Edition New York, 2000—Chapter 5, "Basics of Hydraulic Fracturing"by M.B.Smith and J.W. Shlyapobersky, (pp. 5-1 to 5-28).
Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).
Aveyard et al; "Emulsions stabilised solely by colloidal particles"; Advances in Colloid and Interface Science, vol. 100-102, pp. 503-546 (2003).
Binks et al; "Pickering emulsions stabilized by monodisperse latex particles: Effects of particle size"; Langmuir vol:17 iss:15, p. 4540-4547 (2001).
Montagne etal; "Highly magnetic latexes from submicrometer oil in water ferrofluid emulsions"; Journal of polymer science Part A, Polymer chemistry vol:44 iss:8 p. 2642-2656 (2006).
Park et al; "Rheological Properties and Stabilization of Magnetorheological Fluids in a Water-in-Oil Emulsion"; Journal of Colloid and Interface Science 240, 349-354 (2001).
Pickering, Su; "Emulsions" Journal of the Chemical Society vol. 91 pp. 2001-2021 (1907).
Desgouilles et al.; "The Design of Nanoparticles Obtained by Solvent Evaporation: A Comprehensive Study;" Langmuir, 2003 (19), pp. 9504-9510.
American Chemical Society, "Software estimates chemical, physical properties", Chemical & Engineering News, vol. 63, No. 5, Feb. 4, 1985, p. 27.
Economides, et al., "Fluid loss under static conditions", Reservoir Stimulation, 3rd Edition, John Wiley & Sons, New York, Chapter 8, 2000, pp. 8-23-8-24.
May, et al., "The Effect of Yield Stress on Fracture Fluid Cleanup", SPE 38619—SPE Annual Technical Conference and Exhibition, San Antonio, TX, Oct. 1997, pp. 517-530.

Newkome, et al., "Cascade molecules. Part 6. Synthesis and characterization of two-directional cascade molecules and formation of aqueous gels", Journal of the American Chemical Society, vol. 112, No. 23, 1990, pp. 8458-8465.
Tomalia, et al., "Starburst Dendrimers: Molecular-Level Control of Size, Shape, Surface Chemistry, Topology, and Flexibility from Atoms to Macroscopic Matter", Angewandte Chemie International Edition in English, vol. 29, No. 2, 1990, pp. 138-175.
Voneiff, et al., "The Effects of Unbroken Fracture Fluid on Gaswell Performance", SPE 26664—SPE Production & Facilities, vol. 1, No. 4, Nov. 1996, pp. 223-229.
International Search Report and Written Opinion issued in PCT/US2011/056674 dated Jan. 18, 2012, 17 pages.
International Search Report and Written Opinion issued in PCT/US2014/047114 dated Oct. 1, 2014, 11 pages.
Clariant GmbH, "The Mowiol Range: B4 IR Spectroscopy", in Mowiol-Polyvinyl Alcohol, GCS 1103e, Dec. 1999, pp. B8 to B9.
Lo et al., "Encapsulated Breaker Release Rate at Hydrostatic Pressure and Elevated Temperatures," paper SPE 77744 presented at the 2002 SPE Annual Technical Conference and Exhibition, San Antonio, TX, Sep. 29-Oct. 2, 2002, 15 pages.
Still et al., "An Improved Encapsulated Breaker to Decrease Hydrostatic Release and Improve Thermal Stability," paper SPE 80220 presented at the 2003 SPE International Symposium on Oilfield Chemistry, Houston, TX, Feb. 5-7, 2003, 9 pages.
Geertsma et al., "A Rapid Method of Predicting Width and Extent of Hydraulically Induced Fractures," JPT, Dec. 1969, pp. 1571-1581.
"Drying" retrieved Jul. 14, 2014 from http://en.wikipedia.org/wiki/Drying.
"Embed" retrieved Jul. 14, 2014 from http://dictionary.reference.com/browse/embed?s=t.
International Search Report and Written Opinion of PCT Application No. PCT/US2011/049169 dated Feb. 29, 2012; 12 pages.
Low et al., Designing Fibered Cement Slurries for Lost Circulation Applications: Case Histories, SPE 84617, 2003, 8 pages.
Smith et al., "Chapter 10: Set Mechanisms and Oxygen Nucleophiles", March's Advanced Organic Chemistry Reactions, Mechanisms, and Struture Sixth Edition, John Wiley & Sons: New Jersey, 2007, pp. 470-471 and 532-533.
Written Opinion of PCT Application No. PCT/US2012/063681 dated Mar. 29, 2013; 5 pages.
Nelson et al., "Cement Additives and Mechanisms of Action", AntiSettling agents, Section 3-7, Chapter 3, Well Cementing, Second Edition, 2006, pp. 49-91.
Albertsson et al., "Aliphatic Polyesters: Synthesis, Properties and Applications" Advances in Polymer Science: Degradable Aliphatic Polyesters, vol. 157, 2002, pp. 1-40.
Hakkarainen et al., "Aliphatic Polyesters: Abiotic and Biotic Degradation and Degradation Products", Advances in Polymer Science: Degradable Aliphatic Polyesters, vol. 157, 2002, pp. 113-138.
Stridsberg et al., "Controlled Ring-Opening Polymerization: Polymers with Designed Macromolecutlar Architecture", Advances in Polymer Science: Degradable Aliphatic Polyesters, vol. 157, 2002, pp. 41-65.
Edlund et al., "Degradable Polymer Microspheres for Controlled Drug Delivery", Advances in Polymer Science: Degradable Aliphatic Polyesters, vol. 157, 2002, pp. 67-112.
International Search Report of PCT Application No. PCT/US2012/063681 dated Mar. 29, 2013; 4 pages.

\* cited by examiner

HYDROLYZABLE PARTICLE COMPOSITIONS, TREATMENT FLUIDS AND METHODS

BACKGROUND

The use of treatment fluids in general, and high solids content treatment fluids in particular, may benefit from very good leak off control properties to inhibit fluid loss, as well as good stability, minimal settling of solids, suitable rheological properties for pumping with oilfield equipment, and/or good permeability of a solids pack after placement. Accordingly, there is a demand for further improvements in this area of technology.

SUMMARY

In various embodiments, fine hydrolyzable particles are present and/or used in a composition, treatment fluid or method. In alternative or additional embodiments, hydrolyzable particles are used with or without submicron particles.

DETAILED DESCRIPTION

Figure 1:
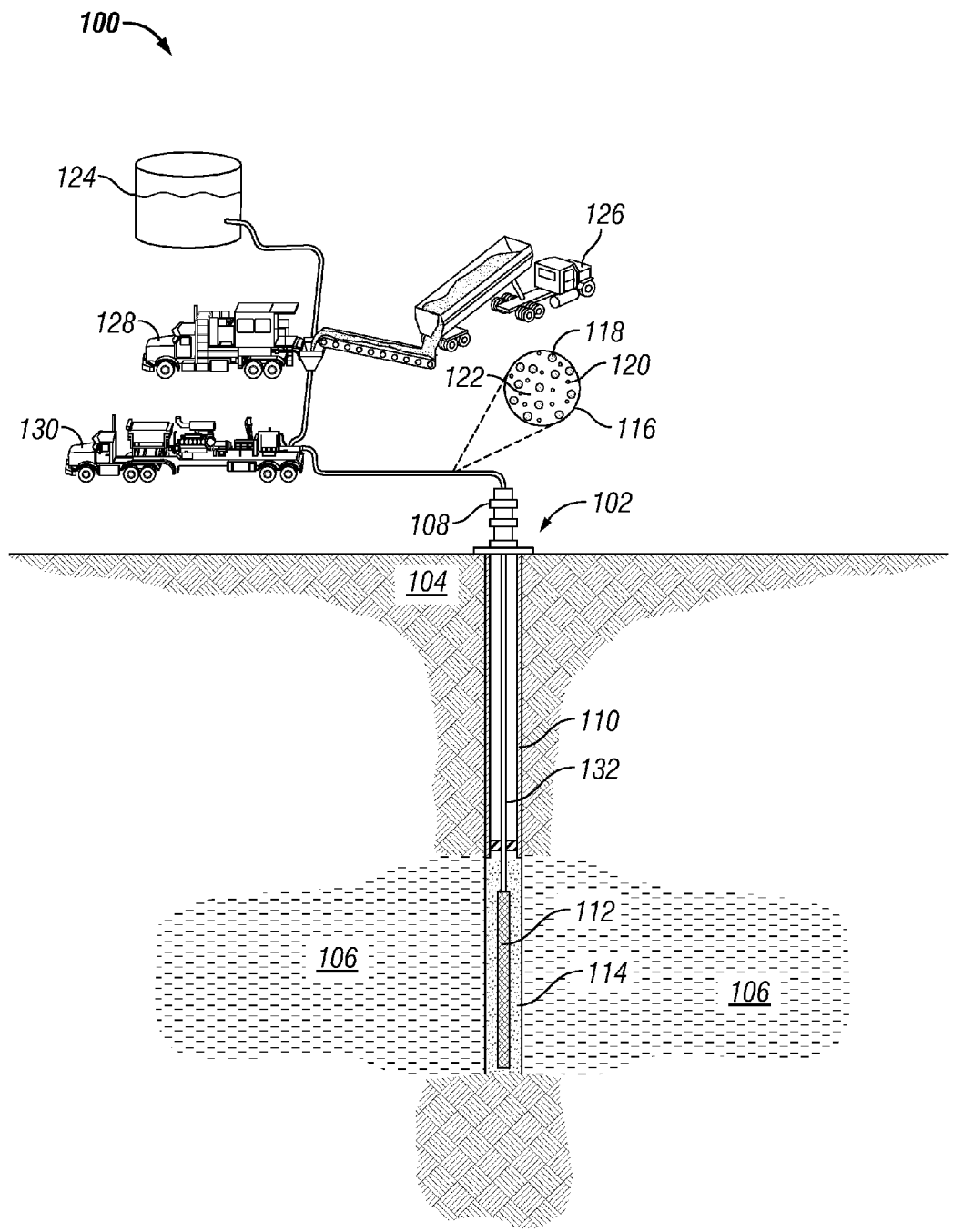
FIG. 1 is a schematic diagram of a system for treating a well with a high solids content fluid according to an embodiment.
Figure 2:
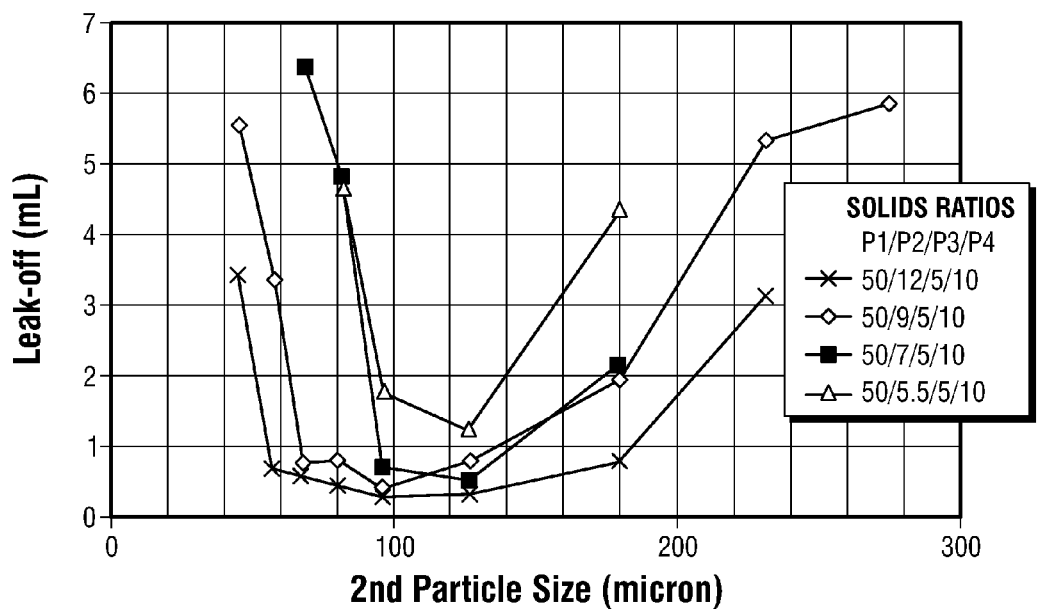
FIG. 2 is a plot of syringe leak-off for a tetramodal slurry as a function of the second largest particle size at different concentrations of the second largest particle, according to an embodiment as discussed in Example 1.
Figure 3:
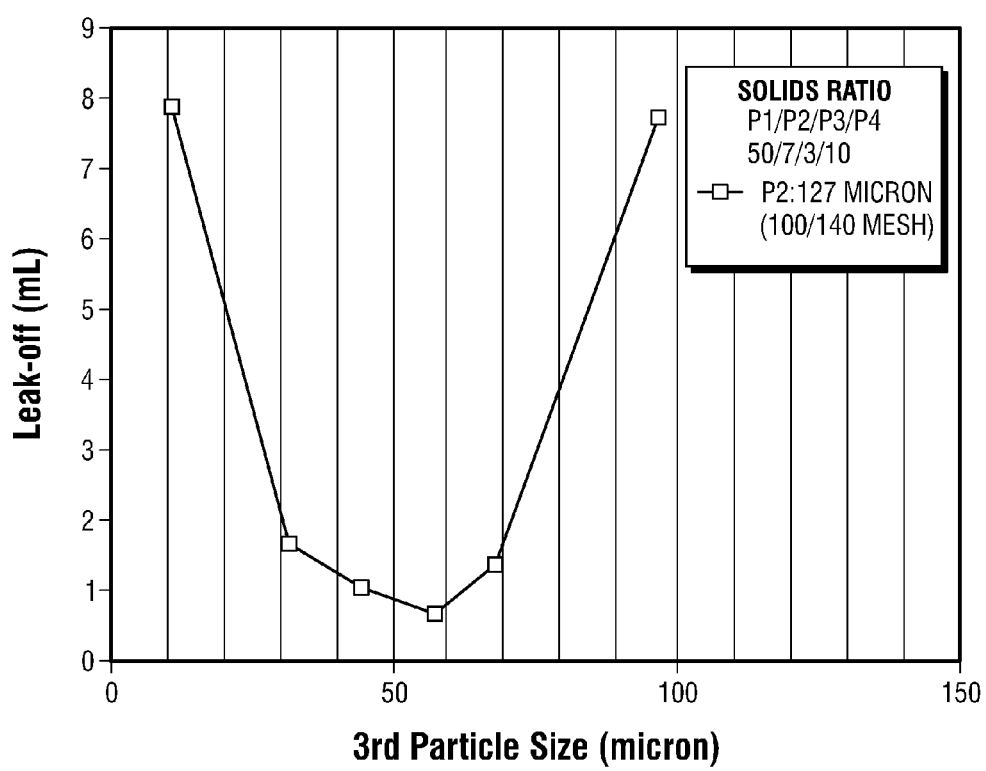
FIG. 3 is a plot of syringe leak-off for a tetramodal slurry as a function of the third largest particle size, according to an embodiment as discussed in Example 1.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."

The term "treatment", or "treating", refers to any subterranean operation that uses a fluid in conjunction with a desired function and/or for a desired purpose. The term "treatment", or "treating", does not imply any particular action by the fluid. The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

The terms "particle" and "particle size" used herein may refer to solids or liquids unless specified.

The term "dispersion" means a mixture of one substance dispersed in another substance, and may include colloidal or non-colloidal systems. The term "fines dispersion" refers to a dispersion of particles having particle diameters of 20 microns or smaller; "fines" refers to the dispersed particles in a fines dispersion. As used herein, "colloidal systems" consist of a dispersed phase having particle diameters of 20 microns or smaller evenly dispersed in a continuous phase; "colloids" refers to the dispersed particles in a colloid system. The terms "fines emulsion", "sol", "hydrosol" (where the continuous phase is aqueous) and "colloidal emulsion" are used interchangeably herein to refer to colloidal systems with solid and/or liquid particles dispersed therein.

As used herein, "emulsion" generally means any system (other than a fines emulsion or a colloidal emulsion) with one liquid phase dispersed in another immiscible liquid phase, and may apply to oil-in-water and water-in-oil emulsions. Invert emulsions refer to any water-in-oil emulsion in which oil is the continuous or external phase and water is the dispersed or internal phase.

As used herein unless otherwise specified, particle size and particle size distribution (PSD) mode refer to the median volume averaged size. The median size used herein may be any value understood in the art, including for example and without limitation a diameter of roughly spherical particulates. In certain embodiments, the median size may be a characteristic dimension, which may be a dimension considered most descriptive of the particles for specifying a size distribution range.

As used herein, the terms "bimodal" and "multimodal" with respect to particle size or other variable distribution have their standard statistical meanings. In statistics, a bimodal distribution is a continuous probability distribution with two different modes. A mixture is considered to be multimodal if it has two or more modes. These modes appear as distinct peaks (local maxima) in the probability density function. A bimodal distribution can arise as a mixture of two different unimodal distributions, i.e., distributions having one mode. For example, a bimodally distributed particle size can be defined as $PSD_1$ with probability $\alpha$ or $PSD_2$ with probability $(1-\alpha)$, where $PSD_1$ and $PSD_2$ are different unimodal particle sizes and 0<α<1 is a mixture coefficient. A mixture of two unimodal distributions with differing means is not necessarily bimodal; however, a mixture of two normal distributions with similar variability is considered to be bimodal if their respective means differ by more than the sum of their respective standard deviations.

As used herein, the term "packing volume factor" refers to the packed volume fraction of a randomly packed mixture of solids having a multimodal volume-averaged particle size distribution.

As used herein, the terms "Apollonianistic," "Apollonianistic packing," "Apollonianistic rule," "Apollonianistic particle size distribution," "Apollonianistic PSD" and similar terms refer to a multimodal volume-averaged particle size distribution with PSD modes that are not necessarily strictly Apollonian wherein either (1) a first PSD mode comprises solids having a volume-averaged median size at least three times larger than the volume-average median size of at least a second PSD mode such that a PVF of the solids mixture exceeds 0.75 or (2) the solids mixture comprises at least three PSD modes, wherein a first amount of particulates have a first PSD, a second amount of particulates have a second PSD, and a third amount of particulates have a third PSD, wherein the first PSD is from two to ten times larger than the second PSD, and wherein the second PSD is at least 1.5 times larger than the third PSD.

As used herein, the term "bridge" refers to the occlusion of passages, e.g., the openings in a formation face, screen element or the like, to inhibit fluid flow. Thus, the term would not apply to the formation of a filter cake on a formation face or screen surface that does not inhibit fluid flow into or from the formation or through the screen. Conversely, "removing a bridge" and similar terms refer to the removal of the occlusions to restore fluid flow and also include modification of the structure of the bridge to an extent sufficient to restore fluid flow, e.g., removing a bridge can involve forming holes through the filter cake and/or removing smaller particles from a filter cake on a screen element to establish permeability, without physically removing the filter cake matrix.

The term "aspect ratio" as applied herein to particles is understood as being the ratio of the longest dimension of the particle to the shortest dimension. A sphere or a cube has an aspect ratio of 1, for example. An aspect ratio greater than one means the particle is elongated in one direction. Sometimes the aspect ratio is given as less than one, meaning that the longest dimension is used in the denominator rather than the numerator, but is understood in the art to be equivalent to its reciprocal where the aspect ratio is greater than one, e.g., an aspect ratios of 0.5 and 2.0 are equivalent, as are 0.25 and 4.0.

The term "proppant" includes proppant or gravel used to hold fractures open and also includes gravel or proppant used in a gravel packing and/or a frac-pack operation.

In one embodiment, a treatment fluid comprises an solids mixture comprising proppant slurried in a carrier fluid, and a fluid loss control agent comprising a hydrolyzable fines dispersion, in intimate admixture therewith. In an embodiment, the hydrolyzable fines dispersion comprises polyester particles. In an embodiment, the hydrolyzable fines may have a particle size distribution mode from 0.1 to 20 microns, from 0.5 to 10 microns, less than 5 microns, or from 1 to 5 microns. In an embodiment, the hydrolyzable fines dispersion comprises polyester particles and a surfactant. In an embodiment, the hydrolyzable fines dispersion comprises a polymer or copolymer of lactic acid, glycolic acid, or the combination thereof, and in another embodiment, the polymer or copolymer may be treated with a nonionic or anionic surfactant. In an embodiment, the hydrolyzable fines dispersion comprises a surfactant and optionally a plasticizer. In an embodiment, the treatment fluid may further comprise from 1 to 15 parts per 100 parts by weight carrier fluid of one or more of a dispersant, a surfactant, a viscosifier, a defoamer, or a combination thereof.

In an embodiment, the treatment fluid may comprise heterogeneous micelles comprising the hydrolyzable fines and surfactant. In an embodiment, the solids mixture is Apollonianistic and may further comprise at least one particle size distribution mode comprising degradable particles, and in a further embodiment, the degradable particles may comprise a polymer or copolymer of lactic acid, glycolic acid, or the combination thereof. In an alternative or additional embodiment, the Apollonianistic solids mixture further comprises an acid-reactive fines particle size distribution mode. In an embodiment, the treatment fluid further comprises submicron particles selected from silicates, γ-alumina, MgO, γ-Fe2O3, TiO2 and combinations thereof.

In one embodiment, a treatment fluid comprises an Apollonianistic solids mixture comprising proppant, degradable particles and submicron particles, slurried in an aqueous carrier fluid, and in intimate admixture therewith, a hydrolyzable polyester fines emulsion comprising 1 to 5 micron particles. In an embodiment, the hydrolyzable polyester comprises a polymer or copolymer of lactic acid, glycolic acid, or the combination thereof. In an embodiment, the degradable particles comprise first and second particle size distribution modes wherein the first particle size distribution mode is from 1.5 to 2.5 times larger than the second particle size distribution mode and wherein the first PSD mode is smaller than the proppant PSD mode. In an embodiment, the carrier fluid comprises from 0 to 3 parts by weight dispersant, from 0 to 3 parts by weight surfactant, from 0 to 3 parts by weight defoamer, and from 0 to 15 parts by weight viscosifier, per 100 parts by weight carrier fluid. In an embodiment, the polylactide emulsion comprises an anionic surfactant and optionally a plasticizer.

In another embodiment, the Apollonianistic solids mixture further comprises acid-reactive fines having a particle size distribution mode smaller than the second PSD mode and comprising from 1 to 20 microns.

In one embodiment, a composition comprises a carrier fluid and dispersed therein from 5 to 100 g added per 100 ml carrier fluid of a fluid loss control system comprising a mixture of surfactant-treated hydrolyzable fines having a particle size distribution between 1 and 10 microns, and submicron particles. In an embodiment, the hydrolyzable fines comprise a polymer or copolymer of lactic acid, glycolic acid, or the combination thereof, emulsified or stabilized with a nonionic or anionic surfactant. In an embodiment, the submicron particles comprise silicates, γ-alumina, MgO, γ-Fe2O3, TiO2 or a combination thereof.

In another embodiment of the composition, the carrier fluid is aqueous, the hydrolyzable fines comprise polylactic acid having a particle size distribution between about 1 and about 5 microns emulsified or stabilized with an anionic surfactant, the submicron particles comprise silicates, γ-alumina, MgO, γ-Fe2O3, TiO2 or a combination thereof, and a weight ratio of the hydrolyzable fines to submicron particles is from 1:3 to 3:1.

In an embodiment, a method comprises mixing an aqueous hydrolyzable polyester fines emulsion and a carrier fluid to form a treatment fluid, and circulating the treatment fluid into a wellbore. In an embodiment, Apollonionistic solids are introduced into the treatment fluid. In an embodiment, a pack of the solids is formed downhole. In an embodiment, the pack comprises proppant and at least one particle size distribution mode comprising degradable particles, and the method further comprises removing the degradable particles from the pack to form a permeable proppant pack. In an embodiment, the method further comprises producing or injecting a fluid through the permeable proppant pack. In an embodiment, the permeable proppant pack comprises a gravel pack in an annulus between a screen and the wellbore, and in an additional or alternate embodiment, the permeable proppant pack is disposed in a fracture. In an embodiment, the degradable particles comprise a polymer or copolymer of lactic acid, glycolic acid, or the combination thereof.

In one embodiment, a method, to inhibit fluid loss from a treatment fluid comprises introducing an aqueous hydrolyzable polyester fines emulsion into the treatment fluid and introducing the treatment fluid into a wellbore.

In one embodiment, a method, to stabilize and inhibit fluid loss from a treatment fluid, comprises introducing submicron particles and an aqueous polylactic acid fines emulsion into the treatment fluid.

The present disclosure in various embodiments describes methods, slurries and systems of fracturing, gravel packing or frac-packing a well using slurries that contain a high fraction of solids comprising an Apollonianistic PSD and a fluid loss control agent comprising polylactide (PLA), polyglycolide (PGA), or a copolymer or mixture thereof. In one embodiment, the solids mixture comprises a plurality of volume-average particle size distribution (PSD) modes such that a packed volume fraction (PVF) of the solids mixture exceeds 0.8. In another embodiment, the smaller PSD modes can be removed from the pack to increase porosity and permeability for the flow of fluids through the pack.

In one embodiment, a method comprises combining a carrier fluid and a solids mixture having an Apollonianistic PSD and a fluid loss control agent comprising polylactide (PLA), polyglycolide (PGA), or a copolymer or mixture thereof, to form a slurry, wherein the solids mixture comprises a degradable material and includes a reactive solid; circulating the slurry through a wellbore to form a pack of the solids in one or both of a fracture in a formation and an annulus between a screen and the wellbore; degrading the fluid loss control agent and the degradable material in the pack to increase porosity and permeability of the pack; and producing a reservoir fluid from the formation through the increased porosity pack.

In one embodiment, the fluid loss control agent comprises emulsified or stabilized particles having a PSD from 1 to 5 microns, or from 1 to 3 microns. In another embodiment, the fluid loss control agent is treated with a stabilizer agent comprising an anionic surfactant.

In one embodiment, the degradable material can be dissolved by changing the pH in the solids pack. For example, alumina trihydrate particles at a neutral pH are solubilized at a high as well as at a low pH. In other embodiments, the degradable material is soluble in basic fluids, e.g., the degradable material is selected from amphoteric oxides, esters, coated acids and combinations thereof; and the solids mixture can further include a base or a base precursor that is optionally sparingly soluble and/or encapsulated, or the solids can be contacted with a basic aqueous solution.

In further embodiments, the degradable material is soluble in acidic fluids, e.g., the degradable material is selected from oxides and hydroxides of aluminum, zinc, tin, lead, boron, silicon and iron; carbonates, sulfates, oxides and hydroxides of calcium, magnesium and barium; and combinations thereof; and the solids mixture can further include an acid or an acid precursor that is optionally sparingly soluble and/or encapsulated, or the solids can be contacted with an acidic aqueous solution. In one embodiment, the acid precursor is selected from the group consisting of hydrolyzable esters, acid anhydrides, acid sulfonates, acid halides and combinations thereof.

In further embodiments, the degradable material can be an encapsulated water- or oil-soluble solid which can be removed from the gravel or proppant pack by de-encapsulating the solid. Alternatively or additionally the degradable material can be a water-soluble solid, and the carrier in the slurry can be either a saturated solution of the soluble solid, e.g. salt solids and brine, or an invert emulsion wherein the soluble solid is dispersed in the oil phase. The soluble solid can be removed by contacting the pack with an undersaturated aqueous medium and/or breaking the invert emulsion.

In further embodiments, the fluid loss additive may further comprise, for example, latex dispersions, water soluble polymers, submicron particles, and particulates with different shapes, and/or a slurry stabilizer, such as, for example, nanoparticles, polymers that hydrate at high temperatures, and high aspect ratio particles.

In another embodiment, the slurry placement may require that the slurry stay suspended for extended periods of time without settling so that rheological characteristics are retained, for example, when the gravel-laden slurry is placed in an open hole followed by screen stab-in there may be a delay of as much as 48 hours between slurry circulation into the wellbore and screen stab-in while the slurry circulation workstring is removed from the hole and the screen is tripped in. If the solids settle prematurely, the high solids content slurry may lose its fluid like properties and an excessive amount of force may be required to push the screen into the settled slurry. In an embodiment, a slurry comprises a solids mixture comprising a plurality of PSD modes such that a PVF exceeds 0.75 or 0.8; a carrier fluid in an amount to provide an SVF less than the PVF of the solids mixture; a hydrolyzable polyester emulsion; and optionally a stability additive to inhibit settling of the solids mixture. In another embodiment, a method comprises combining the carrier fluid, the solids mixture and the fluid loss control additive to form the slurry; circulating the slurry into a wellbore to deposit the slurry downhole; terminating the slurry circulation for a period of time while maintaining stability of the slurry to inhibit settling of the solids mixture; and thereafter circulating the deposited slurry in contact with a surface of a screen.

In embodiments, the treatment fluid comprises submicron particles such as, for example, silicates, γ-alumina, MgO, γ-Fe2O3, TiO2 and combinations thereof; and may optionally further comprise hydratable polymer particles, e.g., polymer particles having a hydration temperature above 60° C. such as gellan gum; high aspect ratio particles, e.g. an aspect ratio above 6, such as, for example, flakes or fibers which may be optionally degradable such as a polymer or copolymer of lactide and/or glycolide.

The treatment fluids, compositions and methods in various embodiments may be used for fracturing a formation, gravel packing, frac-packing, or other operations where the treatment fluid may contain proppants or other solids in addition to the hydrolyzable fines. FIG. 1 is a schematic diagram of one embodiment of a system 100 for gravel packing, by way of illustration and not limitation. In certain embodiments, the system 100 includes a well 102 drilled through an overburden 104 and a formation of interest 106. The formation of interest 106 may include a hydrocarbon producing formation, a water producing formation, a target formation for injection of a fluid, or other formation of interest known in the art. In certain embodiments, the well 102 has a wellhead 108, and a casing 110 covering at least a portion of the wellbore. In the illustration of FIG. 1, the wellbore through the formation of interest 106 is an "open hole" completion in a vertical well. Other types of completions are contemplated in the present application, including without limitation: a cased completion, multiple zone completions, and/or a horizontal well or well segment. The casing 110 may include a cement layer (not shown) between the casing 110 and the formation(s) (104, 106). Various other features of the system 100 that are known in the art are not shown or described herein to avoid obscuring aspects of the present application.

The system 100 further includes, in certain embodiments, a screen 112 disposed in the wellbore. The screen 112 may include slots or holes sized to prevent the flow of particles from the formation of interest 106 into the well 102 or to the surface during treatment flowback or production of the well 102. In certain embodiments, the system 100 includes a gravel pack 114 deposited between the screen 112 and the formation of interest 106.

The gravel of the gravel pack 114 may be deposited as a portion of a slurry 116 comprising particles and a carrier fluid. The carrier fluid may in various embodiments be a brine, a fluid including a hydratable gel (e.g. a guar, other polysaccharide, hydroxyethyl-cellulose "HEC", or other gelling agent), an oil or oil-based gel, a viscoelastic surfactant, a fluid with a viscosifier, a foamed or "energized" fluid (e.g. a nitrogen or $CO_2$ based foam), an emulsion (including water or oil in the external phase), or other fluid known in the art.

In certain embodiments, the slurry 116 is pumped through the well 102 to deposit the first amount of particulates 118 and the second amount of particulates 120 between the screen 112 and the formation of interest 106. The slurry 116 may be pumped outside the screen 112 into the formation of interest 106 until a screen-out occurs (i.e. the particulates 118, 120 build up to the point where the pressure drop across the gravel pack 114 prevents further pumping), the slurry 116 may be circulated through the well 102 such that the slurry 116 passes from outside the screen 112 to inside the screen 112, thereby depositing the particulates 118, 120 between the screen 112 and the formation of interest 106 and circulating the carrier fluid 122 to the surface. In certain embodiments, the slurry 116 may be placed in the wellbore 102 and the screen 112 lowered into the already-placed slurry 116 such that the particulates 118, 120 in the slurry 116 are thereby deposited between the screen 112 and the formation of interest 106.

In certain embodiments, the system 100 includes various devices to control mixing and pumping the slurry 116. In one exemplary embodiment, the system 100 includes at least one fluid tank 124 which contains the carrier fluid 122 and/or a base fluid utilized in the creation of the carrier fluid 122. The exemplary embodiment further includes a gravel carrier 126 which, in one embodiment, provides the first amount of particulates 118 to a blending device 128. The blending device 128 prepares the final slurry 116, for example mixing the gravel fluid 122 and adding the first amount of particulates 118 from the gravel carrier 126, and further adding any additives, the second amount of particulates 120 and/or third and/or the fluid loss control agent or any other amount of particulates. In certain embodiments, more than one particulate amount may be blended and added by the gravel carrier 126 or other device. The blending device 128 further provides the slurry 116 to a pumping device 130 that provides pressurized slurry 116 to the wellhead 108. Other equipment configurations are understood in the art and contemplated herein. For example, and without limitation, the system 100 may include a coiled tubing unit (not shown) in place of one or more pieces of equipment and/or tubing 132 connected to the screen 112.

In various embodiments, each of the methods, processes, treatment fluids, compositions and other aspects of the disclosure in patent application publication US 2011/155371 A1, which is hereby incorporated herein by reference, may be adapted or modified for use with or to include a hydrolyzable fines dispersion as described herein.

In an embodiment, an Apollonianistic treatment fluid comprises a carrier fluid combined with a first, second, and third amount of particles in a slurry. The particulates in an embodiment comprise three size regimes or PSD's, wherein each size regime is larger than the next smaller size regime. The inclusion of varying size particulates with a high particulate loading creates a slurry with greatly reduced settling times relative to a slurry with a uniform particle size.

Further, the amount of carrier fluid per unit volume of slurry can be reduced dramatically. For example, spherical particles with a uniform packing arrangement create a packing volume fraction (PVF) of about 0.74, i.e., where about 74% of the packed volume is particulate matter. Monodisperse spherical particles with a random close packing arrangement create a PVF of about 0.64. By contrast, an arrangement with three particulate sizes having average diameters, in one example, of 840 microns, 150 microns, and 15 microns, respectively, creates a packed mixture of particles having a PVF of about 0.87. The base densities of the particles may be selected to create a final slurry density at a selected value. An increase in PVF reduces the amount of carrier fluid in the final slurry. For example, an increase from 0.64 (random packing) to just 0.80 reduces the amount of carrier fluid in a liter of slurry by nearly 50% (i.e. (36−20)/36). The reduced carrier fluid amount reduces the amount of fluid placed in the formation of interest and the amount of viscosifier (if any) in the gravel pack 114, which all contribute to a reduction in permeability damage to the formation of interest 106 and a reduction in permeability damage to the gravel pack 114.

In certain embodiments, the slurry includes at least a first amount of particulates having a first average size distribution and a second amount of particulates having a second average size distribution. In certain embodiments, the first amount of particulates are non-deformable particulates, e.g., proppant such as sand or ceramic beads. The average size distribution is determined according to any method understood in the art, at least including a mesh screen size number (e.g., 16/30 mesh sand, 20/40 mesh sand or 40/70 mesh sand), a mean particle size, and a median particle size. The average size distributions of the first and second amounts of particulates are selected in an embodiment such that the first average size distribution is between three and fifteen times larger than the second average size distribution. The average size distributions of the first and second amounts of particulates are further selected to prevent migration of formation fines through the gravel pack 114 into the well 102. In certain embodiments, a larger size distribution (e.g. the first size distribution to the second size distribution and/or to a third size distribution) is a value between six and ten times larger. Distributions between six and ten times in this embodiment allow maximal packed volume fraction (PVF) values while providing a gravel pack that does not shrink, or lose pack efficiency, if smaller particle sizes are removed.

In certain embodiments, the slurry includes a third amount of particulates having a third average size distribution, where the second average size distribution is larger than the third size distribution, for example, between 1.5 and three times larger than the third size distribution. For example, the first average size distribution may be a median size of about 840 microns, the second average size distribution may be a median size of about 150 microns, and the third average size distribution may be a median size of about 75 microns; or the first average size distribution may be a median size of about 300 microns, the second average size distribution may be a median size of about 90 microns, and the third average size distribution may be a median size of about 45 microns.

In a further embodiment, the solids mixture comprises four or more PSD modes, wherein a first amount of particulates have a first PSD, a second amount of particulates have a second PSD, a third amount of particulates have a third PSD, and a fourth amount of particulates have a fourth PSD, wherein the first average size distribution is at least three times larger than the second average size distribution, wherein the second average size distribution is larger than the third average size distribution, or at least 1.5 or at least three times larger than the third average size distribution, and wherein the third average size distribution is larger than the fourth average size distribution, or from three to fifteen times larger than the fourth average size distribution. In one embodiment, the first average size distribution is 40 mesh (422 micron) or larger, and in another comprises standard 20/40 mesh (422-853 microns) gravel. In one example, the first PSD is about 280 microns, the second PSD about 30 microns and the third PSD about 3 microns. In one embodiment, a ratio of the total solids volume of the first particles to the total solids volume of the second particles is from about 1:1 to about 15:1, or from about 2:1 to about 10:1 or from about 4:1 to about 8:1; and a ratio of the total solids volume of the second particles to the total solids volume of the third particles is from about 1:10 to about 2:1, or from about 1:4 to about 1:1.

In many treatment fluids and systems it is desirable to employ a fluid loss agent that inhibits fluid loss at a formation face, screen or other potentially fluid permeable surface. The fluid loss agent in various embodiments is useful in a wide variety of treatment fluids including by way of example and not limitation, drilling fluids, completion fluids, stimulating fluids, including fracing fluids, gravel packing fluids, frac-packing fluids, whether containing solids or slick water, pads, flushes, spacers, aqueous systems, non-aqueous systems, oil based, invert emulsions, and the like.

For high solids content fluids (HSCF), fluid loss control can be beneficial since a small amount of fluid loss could render the fluid immobile. Fluid loss control for HSCF is achieved in part by constructing the HSCF with solid particles following a certain particle size distribution using Apollonianistic packing parameters, where the holes created between bigger particles are filled by smaller particles. Apollonianistic packing parameters using sufficiently small particles on the order of particulated leak-off control agents allow some degree of leak off control to be achieved. The leak-off control in Apollonianistic fluids can also employ polymer latex materials to create a film to form an impermeable barrier. The combination of Apollonianistic solids and latex is used in the HSCF system because the leakoff control requirement is much higher than for conventional fluids.

For Apollonianistic packing of particles to stop fluid loss, it is beneficial for the particle sizes to extend to a few nanometer sizes. The gaps or capillaries formed in these packing systems will become small enough that close to 68.9 MPa (10,000 psi) capillary pressure is present. This pressure can essentially stop any fluid loss. It is not easy to have an ideal gradient of particles to achieve this good a fluid loss control. When it comes to production, it is beneficial for the small particles to be cleaned up (removed) to give good permeability to the producing fluid. For the latex case, in fluid loss process, the latex is very effective in building an impermeable layer that prevents fluid from leaking off to the formation. Since the polymer latex is used above its glass transition temperature, it can be pliable and deform to seal small gaps without the need to be exact in particle sizes. However, when it comes to production, the impermeable layer is very damaging, i.e. the formation fluid will not be able to produce through this layer, because it can be difficult to degrade or remove latex from the pack to regain permeability.

In the present embodiments, a hydrolyzable fines dispersion is disclosed for both fluid loss control and cleanup of a high solid content fluid system. In an embodiment, the carrier fluid comprises a fluid loss control system comprising hydrolyzable fines, e.g., particles having a PSD from 0.1 to 20 microns or from 1 to 20 microns or from 1 to 10 microns or from 1 to 5 microns, or from 1 to 3 microns. The hydrolyzable fines are, for example, a polyester polymer such as a polymer or copolymer of lactic acid, glycolic acid or a combination thereof. In one embodiment, the hydrolyzable fines comprise polylactide (PLA), polyglycolide (PGA) or a copolymer of combination thereof. For the purpose of illustration and clarity, the following discussion is in reference to PLA particles by way of example and not limitation.

In an embodiment the PLA particles can include a surfactant and optionally a plasticizer. The PLA particles may be formed by grinding or cryo-grinding of PLA pellets, and treating the particles with surfactant, plasticizer or a combination thereof to enable dispersion, e.g., in a hydrosol or fines emulsion. Alternatively or additionally, the PLA particles can be formed by mixing a solution of the PLA in a solvent with an antisolvent or immiscible liquid (such as an aqueous phase) under high shear conditions, optionally in the presence of a surfactant, plasticizer or combination thereof, to precipitate microparticles in the desired PSD mode. Forty weight percent PLA emulsions often used for coatings and adhesives are commercially available under the trade designations LANDY PL-1000 (5 microns), LANDY PL-2000 (2 microns) and LANDY PL-3000 (1 micron), from Miyoshi Oil & Fat Co., Ltd.

Pretreatment of the PLA particles with surfactant and/or addition of the PLA to the treatment fluid first prepared as a hydrosol or aqueous fines emulsion, e.g., a concentrated masterbatch of from 5 to 60 or from 10 to 50 weight percent solids, or from 20 to 40 weight percent solids, may facilitate dispersion into the treatment fluid and stability of the treatment fluid, which can be difficult where the PLA particles are hydrophobic. The surfactant can additionally or alternatively be added to the treatment fluid separately before or after combining the PLA particles.

Surfactants used to treat the PLA particles or form the hydrosol or fines emulsion may be cationic, zwitterionic, amphoteric, anionic, nonionic or the like. Some non-limiting examples are those cited in U.S. Pat. No. 6,435,277 (Qu et al.) and U.S. Pat. No. 6,703,352 (Dahayanake et al.), each of which are incorporated herein by reference. In an embodiment, the PLA-treating or pretreating surfactants are nonionic or anionic. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

In an embodiment, the nonionic surfactant may be one or more of alkyl alcohol ethoxylates, alkyl phenol ethoxylates, alkyl acid ethoxylates, alkyl amine ethoxylates, sorbitan alkanoates, ethoxylated sorbitan alkanoates, or the like. The nonionic surfactant in one embodiment may be an alkoxylate such as octyl phenol ethoxylate or a polyoxyalkylene such as polyethylene glycol or polypropylene glycol, or a mixture of an alkoxylate or a plurality of alkoxylates with a polyoxyalkylene or a plurality of polyoxyalkylenes, e.g., a mixture of octyl phenol ethoxylate and polyethylene glycol. The nonionic surfactant may also function as a plasticizer which may facilitate formation of a PLA film at the formation surface or deformation of the PLA particles to plug the pore throats or interstitial spaces within the solids pack.

As optional plasticizers in addition to any surfactant per se, the PLA fines may be treated or pretreated with polyethylene glycol, polypropylene glycol, a fatty acid ester, lactide monomer, glycolide monomer, citric acid ester, epoxidized oil, adipate ester, azaleate ester, acetylated coconut oil, or combinations thereof or the like. The plasticizer may be blended with the PLA in the melt, as pellets, in the PLA emulsion or masterbatch, etc. The plasticizer can additionally or alternatively be added to the well treatment fluid separately before or after introducing the PLA particles.

The PLA hydrosol or fines emulsion may incorporate the surfactant and the optional plasticizer or blend of surfactants and/or plasticizers in an amount of about 0.02 wt % to about 5 wt % of total liquid phase weight in the emulsion or hydrosol, or from about 0.3 wt % to about 3 wt % of total liquid phase weight.

In an embodiment, the PLA hydrosol or fines emulsion may form micelles comprising liquid PLA particles where the PLA is liquid or in solution in a suitable solvent, for example, where the PLA solution is immiscible in the continuous phase liquid, e.g. water. The liquid-in-liquid emulsion may be stabilized with a surfactant, dispersant or the like which may be present within the micelles, in the continuous phase, at an interface between the micelles and the continuous phase, or a combination thereof. The PLA hydrosol or fines emulsion added to the carrier fluid, in one embodiment, may form heterogeneous micelles or dispersed particles or particle aggregates comprising the surfactant and the PLA particles, and/or such heterogeneous micelles may form in the treatment fluid. These liquid and/or heterogeneous micelles may function as particles in the treatment fluid or proppant pack to plug pore throats in the packed solids and/or in the formation. The size of the PLA particles and/or the micelles can be selected to give the best performance. For example, the size of the micelles can be controlled by the surfactant selection. The micelles and the PLA particles, especially plasticized PLA solids, can also have certain flexibility or pliability to deform and seal non-exact size or irregularly shaped pore throats.

This fluid loss control agent and system can be used in one embodiment with HSCF systems or Apollonianistic systems, but in other embodiments can be used in other fluids or treatment fluids.

In an embodiment, the PLA particles and micelles can be degraded, destroyed or otherwise removed after the stimulation. The PLA hydrolyzes in the presence of water at elevated temperatures, and the PLA properties can be tailored to hydrolyze at the formation temperature and fluid chemistry in the particular downhole conditions to achieve complete hydrolysis in the desired time frame while allowing sufficient delay to complete placement and other steps in the stimulation operation. The surfactant micelles can be destroyed by the presence of hydrocarbons, such as from the formation, reaction with a de-emulsifier, degradation of the surfactant, or the like. As one example, the PLA hydrolysis products are organic acids which can interfere with and alter the micelle structure. Acid precursors can also be present in the intermediate sized particles in the Apollonianistic solids, for example.

In some embodiments, the surfactant micelles and/or PLA particles stabilized by surfactant are used as a fluid control agent. The micelles formed this way can be controlled by the specific surfactant used, amount of discontinuous phase etc. A wide spectrum of micelle sizes and geometries can be achieved in this way. Since the heterogeneous micelles formed here are based on self assembly with Van der Walls force, they are not entirely rigid. The suspended PLA particles can also be pliable where suitable plasticized. Under certain pressure, the micelles and/or the PLA particles can actually deform to accommodate some shape changes. The micelles and/or particles formed in this way will help fluid loss control by both plugging the size-specific pore throats and being pliable to seal holes that are not a perfect fit. Stated differently, in an embodiment the fluid loss control system has filming and particle characteristics similar to latex so that it can form "film-like" low permeability layer during stimulation treatments, and yet the resulting "film" will not have the permanence characteristics of a latex film and can be easily removed at downhole conditions to restore permeability.

In certain embodiments, the mixing of particulates with size ratios as described herein allows high particulate loadings with a low or zero viscosifier loading. In certain embodiments, the carrier fluid includes a brine with no viscosifiers (slickwater), and the sum of the mass of the particulates (i.e. the first amount, second amount, and/or any third or other amounts combined) is at least about 2.4 kg per liter of carrier fluid 122 (20 pounds per gallon). In some embodiments the carrier fluid comprises a hydratable gelling agent in an amount of from about 20 to about 100 g per liter of carrier fluid. In certain embodiments, the carrier fluid includes a hydratable gelling agent present in an amount less than about 2.4 g gel per liter of carrier fluid (20 lb gel per 1000 gallons), for example less than 2.15 g/L (18 lb gel per 1000 gallons of carrier fluid), and the sum of the mass of the particulates exceeds about 2.75 kg per liter (23 pounds per gallon) of carrier fluid 122. In certain embodiments, the carrier fluid 122 includes a viscosifier present in an amount less than 20 lb per thousand gallons of carrier fluid 122, and the sum of the mass of the particulates exceeds about 2.75 kg per liter (23 pounds per gallon) of carrier fluid 122. In certain embodiments, the carrier fluid 122 includes a viscosifier present in an amount less than 2.4 g gel per liter (20 lb gel per 1000 gallons) of carrier fluid 122, and the sum of the mass of the particulates exceeds about 3.6 kg per liter (30 pounds per gallon) of carrier fluid 122.

In an embodiment, the solids loading in the slurry can be expressed as a volumetric ratio of solids to carrier fluid. In one embodiment, a minimum volume of the liquid (maximum volumetric solids loading) corresponds to the solids:carrier fluid volumetric ratio in the slurry corresponding to the PVF for the solids mixture, i.e. PVF:(1−PVF), or a slight excess of liquid to impart rheological characteristics to the slurry, whereas too much excess carrier liquid might induce instability of the slurry (solids settling or syneresis). In one embodiment, the solids:carrier fluid volumetric ratio is from about 40:60 up to PVF:(1−PVF), or from 45:55 to 85:15 or from 50:50 to 75:25. In other embodiments, the volume fraction of the carrier fluid is from stoichiometric (1−PVF) or from above stoichiometric up to 3, 2.5, 2, 1.5, 1.25, 1.2, 1.1 or 1.05 times stoichiometric, or stated differently, the volumetric solids fraction is from (3PVF−2), (2.5PVF−1.5), (2PVF−1), (1.5PVF−0.5), (1.25PVF−0.25), (1.2PVF−0.2), (1.1PVF−0.1) or (1.05PVF−0.05) up to PVF.

The limits for minimum viscosifier loading and maximum particulate loading depend upon factors specific to each system that will ordinarily be understood or controlled by those of skill in the art. For example, the settling time of the particulates in the carrier fluid, the viscosity of the carrier fluid, the intended pumping rate of the slurry, the length of the screen interval wherein the gravel pack is to be placed, the fracture strength of the formation of interest, and other factors known to those of skill in the art all contribute to the viscosifier loading required in a particular application. Using brine as a carrier fluid with the layered particulate sizes, including a third and/or additional particulate sizes, slurries have been developed with particulates up to or exceeding 1.92 (16 lb per gallon) or 2.4 kg per liter (20 lb per gallon) of carrier fluid, and in certain applications the particulates can exceed 3.6 kg per liter (30 lb per gallon) of carrier fluid.

In certain embodiments, at least one of the smaller particulate sizes (i.e. the second, third, fourth, and/or fifth amount of particulates) include a degradable material. The inclusion of degradable material allows the particulates to participate in improving suspension of particles in the slurry, while allowing the particles to be removed in the gravel pack after placement, and/or to allow the particles to release beneficial chemicals into the gravel pack after placement. For example, the degradation of the particulates may release chemicals that dissolve bridging agents, break crosslinked or polymer-based carrier fluid, and/or that attack a filter cake formed.

Examples of degradable materials include, without limitation, wax, oil-soluble resin, materials soluble in hydrocarbons, lactide, glycolide, aliphatic polyester, poly(lactide), poly(glycolide), poly(ε-caprolactone), poly(orthoester), poly(hydroxybutyrate), aliphatic polycarbonate, poly(phosphazene), poly(anhydride), poly(saccharide), dextran, cellulose, chitin, chitosan, protein, poly(amino acid), polyethylene oxide), and copolymers including polylactic acids) and/or poly(glycolic acids), and the like. In certain embodiments, degradable materials may include a copolymer including a first moiety that is a hydroxyl group, a carboxylic acid group, and/or a hydrocarboxylic acid group, and a second moiety that is a glycolic acid and/or a lactic acid.

In one embodiment, the intermediate PSD modes comprise a degradable material which is hydrolyzable, and in another embodiment, the hydrolyzable intermediate PSD modes comprise the same material as the hydrolyzable fines, e.g., a polymer or copolymer of lactic acid, glycolic acid or a combination thereof when the hydrolyzable fines comprise a polymer or copolymer of lactic acid, glycolic acid or a combination thereof.

In certain further embodiments, at least one of the smaller particulate sizes includes a reactive solid that reacts with a hydrolysis product of a degradable material. For example, the second amount of particulates may be a degradable material and the third amount of particulates may be a material that reacts with the hydrolysis product of the second amount of particulates, enhancing the rate of degradation of the second amount of particulates. In certain embodiments, the reactive solid includes ground quartz, oil soluble resin, degradable rock salt, clay, and/or zeolite or the like. In certain embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass or the like. The degradable materials and reactive solids that enhance degradation may be stored on the same particle, such that reactions do not occur at the surface but begin within the fluids at downhole conditions.

In one embodiment the reactive solid is reactive with one or more of the hydrolysis products of the hydrolyzable fines, e.g., the reactive solid is acid reactive (e.g., calcium carbonate) when the hydrolyzable fines comprise a polymer or copolymer of lactic acid, glycolic acid or a combination thereof.

In certain embodiments, the slurry comprises a degradable material and includes a reactive solid.

In one embodiment, the first PSD mode comprises gravel and the second PSD mode comprises alumina trihydrate particles. Alumina trihydrate particles become soluble at elevated or depressed pH, and thus can be degraded by changing a pH in the pack to solubilize the alumina trihydrate particles. In another embodiment, the degradable material can be soluble in either basic or acidic fluids, and can be degraded by increasing or decreasing the pH, respectively, to dissolve the particles, e.g., by contacting the solids pack with a basic aqueous solution or an acidic aqueous solution. For example, the degradable material can be selected from amphoteric oxides, esters, coated acids, combinations thereof, and the like. Acid precursors which can be mentioned as suitable particulates include hydrolyzable esters, acid anhydrides, acid sulfonates, acid halides, combinations thereof and the like. As another example, the solids mixture can include a base or base precursor, which can in some embodiments be sparingly soluble or encapsulated. Representative classes of bases include alkali metal and ammonium hydroxides, organic amines, urea, substituted urea, combinations thereof and the like. Specific representative examples of acid soluble particulates include oxides and hydroxides of aluminum, zinc, tin, lead, boron, silicon and iron; carbonates, sulfates, oxides and hydroxides of calcium, magnesium and barium; combinations thereof and the like.

In one embodiment, the degradable second PSD mode can be or include an encapsulated water- or oil-soluble solid, and can be degraded by de-encapsulating the soluble solid and contacting the solids pack with aqueous or hydrocarbon fluid, e.g., with reservoir fluids. In another embodiment, the degradable particulates can be or include a water-soluble solid and the carrier fluid can be a saturated aqueous solution of the water-soluble solid, whereby degradation can be effected by contacting the pack with an undersaturated aqueous medium. For example, the soluble particulates can be or include salt and the carrier fluid can be brine. In another embodiment, the degradable particulates can be or include a water-soluble solid, and the carrier fluid can be an invert emulsion wherein the water-soluble solid is dispersed in an oil phase, whereby the degradation can be effected by breaking the invert emulsion to dissolve the water-soluble solid in an aqueous medium. The invert emulsion can be broken, for example, by contacting the pack with a de-emulsifier, pH control agent or the like. Representative pH control agents which may be mentioned include monoesters, polyesters, weak acids, weak bases, urea, urea derivatives, combinations thereof and the like.

In certain embodiments, at least one of the amount of particulates (e.g., first through fifth) includes an encapsulated breaker that reduces the viscosity of the carrier fluid after placement of the gravel pack reducing permeability damage of the pack. In certain embodiments, the carrier fluid includes an emulsion, which can be the same or different as any hydrolyzable fines emulsion, and at least one of the amount of particulates includes a chemical adapted to assist in breaking the emulsion. In certain further embodiments, the chemical adapted to assist in breaking the emulsion is encapsulated and/or included on a coated particle, such that the chemical is not released to break the emulsion until after the gravel pack is placed. In certain further embodiments, one or more of the amount of particulates comprises coated particles, such that the particles do not begin to degrade and/or release chemicals, breakers, solvents, and/or surfactants or the like until after the gravel pack is placed. Any coating on a particle may be adapted to break down with time, temperature, fluids expected to be encountered in the wellbore, chemicals or reactive solids included on other particles and/or in the carrier fluid that are released under other mechanisms.

In one exemplary embodiment, the carrier fluid comprises an invert emulsion, the second amount of particulates includes a surfactant that breaks the emulsion and the second amount of particulates are coated with a material that breaks down in the presence of a chemical in the third amount of particulates. In the example, the third amount of particulates includes a coating that degrades in the presence of hydrocarbons (e.g. as produced from the formation of interest) that releases the chemical breaking down the coating on the second amount of particulates. Similar configurations of particles, coatings, chemicals, and the like are contemplated in the present application.

In certain embodiments, one or more of the particulates includes a formation face damage removal agent. The damage removal agent may be a chemical (e.g. an acid and/or an oxidizer) structured to remove formation face damage, and/or a physical agent (e.g. particles of a specific shape, size, or material to break an emulsion). The damage removal agent may be any damage removal material known in the art, and may be included in any of the particulates. Further, and without limitation, the damage removal agent may be within a particle that enters the fluid in the wellbore on dissolution, and/or is embedded within a coated particle. The formation face may have permeability damage from the gravel pack fluid filter cake, from a fluid loss agent in the gravel pack (other than the hydrolyzable fines dispersion), from a drilling mud filter cake, from a fluid loss agent in the drilling mud, and/or residual damage from a pill (e.g. a high viscosity pill pumped during drilling to stop fluid loss) pumped during drilling or completion of the wellbore. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm-1 μm such as γ-alumina, fumed or colloidal silica, $CaCO_3$, $SiO_2$, TiO2, bentonite, other silicates, etc.; particulates with different shapes such as glass fibers, flakes, films; and any combination thereof or the like. In one embodiment the fluid loss agents are colloidal.

In certain embodiments, the amount of particulates comprise particles having an aspect ratio of greater than or equal to one, or greater than or equal to 6, 10, 25, 50, 100, 200 or 300. In certain embodiments, particles with a higher aspect ratio have enhanced surface area per unit volume and enhance degradation and/or reaction rates for the particles. In certain embodiments, the amount of particulates comprises particles having a nano-structure, micro-structure, or mesoporous structure that enhance the surface area of the particles. The structures of the particles may be fractal or non-fractal. In certain embodiments, at least one of the particulates includes a tackifying agent such as a resin-coating.

The treatment fluid, in addition to the solids, fluid loss control agent and carrier fluid may contain additional leak-off control agent, stability agent, dispersant or the like, and can contain various components and additives well known to be present in treatment fluids, including water, brine, oil, emulsion, invert emulsion, solvents, foaming or energizing agent, viscosifiers, surfactants, crosslinkers, friction reducers, breakers, accelerators, retarders, antioxidants, pH stabilizers and control agents, etc.

In embodiments, the slurry is comprised of a carrier fluid, a solids mixture, a fluid loss control agent and a stability additive, wherein the solids mixture comprises a plurality of PSD modes such that a packed volume fraction (PVF) exceeds 0.75, or exceeds 0.8. The stability additive helps inhibit settling of the solids mixture in the slurry, and thus maintain its rheological characteristics. This can be beneficial where the slurry has to be prepared in advance of use or where the slurry is placed in the wellbore with considerable delay before it contacts the screen, e.g., where the workstring is tripped out to attach the screen after slurry placement. The stability additive in one embodiment comprises submicron particles, such as, for example, silicates such as silica (including fumed silica or colloidal silica), γ-alumina, MgO, γ-Fe2O3, TiO2, combinations thereof and the like. Silicates may include, for example, fumed silica, colloidal silica, diotamaceous earth and any of the silica minerals including orthosilicates; sorosilicates; cyclosilicates; inosilicates; phyllosilicates, e.g., micas and clays such as bentonite, montmorillonite and kaolinite; tectosilicates, e.g., quartz; combinations thereof and the like. In an embodiment, the silicates are colloidal. In one embodiment the submicron particles have a diameter between 5 and 200 nm, and in another embodiment the submicron particles are colloids.

In another embodiment, the stability additive comprises hydratable polymer particles, especially polymer particles which are hydrated at downhole temperatures such as above 60° C., for example, heteropolysaccharides such as gellan gum. Stabilizing particles can also include particles having an aspect ratio above 6, 10, 20, 50, 100, 200, 300 or the like, especially flakes or fibers comprising a polymer or copolymer of lactic acid, glycolic acid, a combination thereof or the like. In a particular embodiment, the slurry has a solids volume fraction (SVF) from 0.5 to 0.75, or from 0.55 to 0.7, or from 0.56 to 0.68, or from 0.58 to 0.66. In various embodiments, the solids mixture is trimodal, tetramodal, pentamodal or the like, and can remain stable and flowable for at least 48 hours.

In another embodiment, the treatment fluid may include a dispersant that may be helpful to improve stability and/or to remove fines from a solids pack formed from a slurry comprising at least a carrier fluid, a hydrolyzable fines dispersion and a solids mixture, e.g., an Apollonianistic solids mixture. The dispersant can be present in the slurry, in another fluid used to displace the carrier fluid from the proppant pack, or in a fluid circulated and/or spotted in the wellbore after forming the pack. In an embodiment, the dispersant comprises a polyelectrolyte, for example, polysulfonate, such as lignosulfonate, polymelamine sulfonate, polystyrene sulfonate, polynaphthalene sulfonate or the like; polycarboxylate, such as a polyacrylate having a weight average molecular weight less than 10,000 Daltons; combinations thereof and the like. In one embodiment, the dispersant comprises a surfactant, e.g., an anionic, cationic, amphoteric, zwitterionic or nonionic surfactant. At low concentrations, surfactants can have a coagulating effect on fines, however, at sufficiently high concentrations the surfactants are effective as fines dispersants. In general, the higher the salinity the more dispersant that is required, especially in regards to the ionic dispersants. Where the carrier fluid is a brine or especially a high brine, nonionic surfactants such as polyoxyethylenes (including polyethylene glycol) may be beneficial since they are less affected by salinity. In general, a weight ratio between the dispersant and the fines, including the hydrolyzable fines particles, is from about 1:500 to 10:90.

The fines dispersed by the dispersant in various embodiments are silica, calcium carbonate, or the like. The fines can if desired be agglomerated in the slurry. The slurry can comprise a volume fraction of solids from about 0.45 up to the PVF, and a volume fraction of carrier fluid from (1−PVF) up to 0.55, or up to 2.5*(1−PVF) in one embodiment. In embodiments the proppant PSD mode is from 100 to 2000 microns, the fines PSD mode from 1 to 20 microns, and/or the proppant PSD mode is from 18 to 900 times larger than the fines PSD mode. In some embodiments, the slurry further comprises one or more intermediate PSD modes, and may also be selected from PSD modes from 2 to 60 times smaller than the proppant PSD mode, PSD modes from 1.1 to 60 times larger than the fines PSD mode, and combinations thereof. In a particular embodiment, the intermediate PSD modes can include a relatively larger PSD mode and a relatively smaller intermediate PSD mode, or wherein the larger intermediate PSD mode is from 2 to 15 times smaller than the proppant PSD mode and from 1.25 to 15 times larger than the smaller intermediate PSD mode, and or wherein the smaller intermediate mode is from 1.1 to 15 times larger than the fines PSD mode. In a further embodiment, the slurry further comprises a middle intermediate PSD mode from 1.5 to 4 times smaller than the larger intermediate PSD mode and 1.25 to 2.5 times larger than the smaller PSD mode. In one embodiment, at least one of the intermediate PSD modes is degradable, for example, the larger intermediate PSD mode.

In a further embodiment, the slurry comprises a solids mixture in a carrier fluid, wherein the solids mixture comprises first, second, third and fourth volume-averaged particle size distribution (PSD) modes such that a packed volume fraction (PVF) of the solids mixture is greater than 0.75, or greater than 0.80; and a solids volume fraction (SVF) of the slurry is less than the PVF of the solids mixture; wherein the first PSD mode is at least three times larger than the second PSD mode, the second PSD mode is larger than the third PSD mode, and the third PSD mode is larger than the fourth PSD mode, and wherein at least one of the second and third PSD modes is less than 3 times larger than the respective third or fourth PSD mode. In one embodiment, the first PSD mode is from 3 to 10 times larger than the second PSD mode, or about 5 to about 7, or about 5.4 to about 6.9, or about 5.6 to about 6.6 times larger than the second PSD mode, the second PSD mode is from 1.5 to 4 times larger than the third PSD mode, e.g., from about 2 to about 2.4 times larger than the third PSD mode. The slurry can also include a fourth and/or a fifth PSD mode, wherein the fourth PSD mode is larger than the fifth PSD mode, for example, less than 3 times larger than the fifth PSD mode. If the fourth PSD mode is present, the third PSD mode is at least 1.25 times larger than the fourth PSD mode, for example, up to about 2.5, or about 1.8 or 1.9 times larger than the fourth PSD mode, and if the fifth PSD mode is present, the fourth PSD mode is at least 1.1 times larger than the fifth PSD mode, or up to 2 times larger than the fifth PSD mode, or about 1.6.

In one embodiment, the first PSD mode is from about 422 microns up to about 853 microns (20/40 mesh), the second PSD mode is from about 60 microns up to about 180 microns (or from about 100 microns up to about 150 microns), the third PSD mode is from about 25 microns up to about 70 microns (or from about 40 microns up to about 60 microns), the fourth PSD mode if present is from about 1 micron up to about 40 microns, and the fifth PSD mode, if present, is from about 1 micron up to about 25 microns. In another embodiment, the fifth PSD mode is at least 1 micron and the first PSD mode is from about 422 microns (40 mesh) up to about 853 microns (20 mesh). In an embodiment, the second PSD mode comprises a total SVF from 5 to 30 percent (or from 10 to 20 percent, or from 10 to 15 percent), the third PSD mode comprises a total SVF from 3 to 20 percent (or from 3 to 10 percent), the fourth PSD mode comprises a total SVF from 5 to 40 percent (or from 10 to 30 percent), based on a total SVF of the first PSD mode, and the fifth PSD mode, if present, comprises a total SVF from 1 to 40 percent, based on a total SVF of the first PSD mode. Additionally or alternatively, the second PSD mode comprises a total SVF from 5 to 30, or 10 to 20, percent of a total SVF of the first PSD mode; the third PSD mode comprises a total SVF from 10 to 100, or 30 to 60, percent of the total SVF of the second PSD mode; the fourth PSD mode comprises a total SVF from 10 to 100, or 30 to 80, percent of the total SVF of the third PSD mode; and if present, the fifth PSD mode comprises a total SVF from 10 to 500, or 100 to 400, percent of the total SVF of the fourth PSD mode. In embodiments, the slurry can also comprise a fluid loss agent, a dispersant, and/or wherein at least one of the second, third, fourth or fifth PSD modes comprises a degradable material.

As is evident from the figures and text presented above, as well as the examples below, a variety of embodiments are contemplated:

1. A method, comprising: combining a carrier fluid, a solids mixture and a hydrolyzable fines dispersion to form a flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or exceeds 0.8, and wherein the solids mixture, e.g., the second PSD mode, comprises a degradable material and includes a reactive solid; circulating the slurry through a wellbore to form a pack of the solids mixture having a PVF exceeding 0.75 or exceeds 0.8 in one or both of a fracture in a formation and an annulus between a screen and the wellbore; degrading the degradable material in the pack to increase porosity and permeability of the pack; and producing a reservoir fluid from the formation through the increased porosity pack.
2. The method of embodiment 1, wherein the carrier fluid is a low viscosity fluid free of viscosifier or comprising viscosifier in an amount less than 2.4 g of viscosifier per liter of carrier fluid (20 lb/1000 gal).
3. The method of embodiment 1 or 2, wherein the slurry is stable and has a high particulate loading comprising at least 3.6 kg of the solids mixture per liter of the carrier fluid (30 lb/gal).
4. The method of embodiment 1, 2 or 3, wherein the first PSD mode comprises gravel and the second PSD mode comprises alumina trihydrate particles, and wherein the degradation comprises changing a pH in the pack to solubilize the alumina trihydrate particles.
5. The method of any one of embodiments 1 to 4, wherein the degradable material is soluble in basic fluids and the degradation comprises increasing a pH in the pack to dissolve the degradable material.
6. The method of embodiment 5, wherein the degradable material is selected from the group consisting of amphoteric oxides, esters, coated acids and combinations thereof.
7. The method of any one of embodiments 1 to 6, wherein the solids mixture comprises base or base precursor.
8. The method of embodiment 7, wherein the base or base precursor is sparingly soluble or encapsulated.
9. The method of embodiment 7 or 8, wherein the base is selected from the group consisting of alkali metal and ammonium hydroxides, organic amines, urea, substituted urea and combinations thereof.
10. The method of any one of embodiments 1 to 9, comprising contacting the pack with a basic aqueous solution.
11. The method of any one of embodiments 1 to 4, wherein the degradable material is soluble in acidic fluids and the degradation comprises decreasing a pH in the pack to dissolve the degradable material.
12. The method of embodiment 1 or 11, wherein the degradable material is selected from the group consisting of oxides and hydroxides of aluminum, zinc, tin, lead, boron, silicon and iron; carbonates, sulfates, oxides and hydroxides of calcium, magnesium and barium; and combinations thereof.
13. The method of embodiment 1, 11 or 12, wherein the solids mixture comprises an acid or acid precursor.
14. The method of embodiment 13, wherein the acid or acid precursor is sparingly soluble or encapsulated.
15. The method of embodiment 13 or 14, wherein the acid precursor is selected from the group consisting of hydrolyzable esters, acid anhydrides, acid sulfonates, acid halides and combinations thereof.
16. The method of any one of embodiments 1 or 11 to 15, comprising contacting the pack with an acidic aqueous solution.
17. The method of any one of embodiments 11 to 16, wherein the second PSD mode comprises an encapsulated water- or oil-soluble solid, and the degradation comprises de-encapsulating the soluble solid.
18. The method of any one of embodiments 11 to 17, wherein the second PSD mode comprises a water-soluble solid and the carrier fluid comprises a saturated aqueous solution of the water-soluble solid, and the degradation comprises contacting the pack with an undersaturated aqueous medium.
19. The method of any one of embodiments 11 to 17, wherein the second PSD mode comprises a water-soluble solid, and the carrier fluid comprises an invert oil emulsion wherein the water-soluble solid is dispersed in an oil phase, and the degradation comprises breaking the emulsion to dissolve the water-soluble solid in an aqueous medium.
20. The method of embodiment 19, comprising contacting the pack with a de-emulsifier to break the emulsion.
21. The method of embodiment 19 or 20, comprising contacting the pack with a pH control agent to break the emulsion.
22. The method of embodiment 21, wherein the pH control agent is selected from the group consisting of monoesters, polyesters, weak acids, weak bases, urea, urea derivatives and combinations thereof.
23. The method of any one of embodiments 1 to 22, wherein the degradable material comprises a soluble material.
24. The method of embodiment 23, wherein the carrier fluid is saturated with respect to the soluble material.
25. The method of embodiment 23 or 24, wherein the soluble material comprises salt and the carrier fluid comprises brine.
26. A composition, comprising: a carrier fluid, a solids mixture and a hydrolyzable fines dispersion combined to form a flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or exceeds 0.8, and wherein the solids mixture, e.g., the second PSD mode, comprises a degradable material and includes a reactive solid.
27. The composition of embodiment 26, wherein the carrier fluid is a low viscosity fluid free of viscosifier or comprising viscosifier in an amount less than 2.4 g of viscosifier per liter of carrier fluid (20 lb/1000 gal).
28. The composition of embodiment 26 or 27, wherein the slurry is stable and has a high particulate loading comprising at least 3.6 kg of the solids mixture per liter of the carrier fluid (30 lb/gal).
29. The composition of embodiment 26, 27 or 28, wherein the first PSD mode comprises gravel and the second PSD mode comprises alumina trihydrate particles.
30. The composition of any one of embodiments 26 to 30, wherein the degradable material is soluble in basic fluids.
31. The composition of embodiment 30, wherein the degradable material is selected from the group consisting of amphoteric oxides, esters, coated acids and combinations thereof.
32. The composition of any one of embodiments 26 to 31, wherein the solids mixture comprises base or base precursor.
33. The composition of embodiment 32, wherein the base or base precursor is sparingly soluble or encapsulated.
34. The composition of embodiment 32 or 33, wherein the base is selected from the group consisting of alkali metal and ammonium hydroxides, organic amines, urea, substituted urea and combinations thereof.
35. The composition of any one of embodiments 26 to 29, wherein the degradable material is soluble in acidic fluids.

36. The composition of any one of embodiments 26 to 30 or 35, wherein the degradable material is selected from the group consisting of oxides and hydroxides of aluminum, zinc, tin, lead, boron, silicon and iron; carbonates, sulfates, oxides and hydroxides of calcium, magnesium and barium; and combinations thereof.
37. The composition of any one of embodiments 26 to 30 or 35 to 36, wherein the solids mixture comprises an acid or acid precursor.
38. The composition of embodiment 37, wherein the acid or acid precursor is sparingly soluble or encapsulated.
39. The composition of embodiment 37 or 38, wherein the acid precursor is selected from the group consisting of hydrolyzable esters, acid anhydrides, acid sulfonates, acid halides and combinations thereof.
40. The composition of any one of embodiments 26 to 39, wherein the second PSD mode comprises an encapsulated water- or oil-soluble solid.
41. The composition of any one of embodiments 26 to 39, wherein the second PSD mode comprises a water-soluble solid and the carrier fluid comprises a saturated aqueous solution of the water-soluble solid.
42. The composition of embodiment 40 or 41, wherein the soluble material comprises salt and the carrier fluid comprises brine.
43. The composition of any one of embodiments 26 to 39, wherein the second PSD mode comprises a water-soluble solid, and the carrier fluid comprises an invert oil emulsion wherein the water-soluble solid is dispersed in an oil phase.
44. A method, comprising: combining a carrier fluid, a solids mixture and a hydrolyzable fines dispersion to form a flowable slurry, wherein the solids mixture comprises a plurality of volume-averaged particle size distribution (PSD) modes such that a packed volume fraction (PVF) of the solids mixture exceeds 0.75, or exceeds 0.8; contacting a screen with a fluid comprising leak-off control agent to form a bridge on the screen to inhibit fluid entry; positioning the screen in a wellbore and circulating the slurry through the wellbore in any order such that the solids mixture is deposited between the screen and the wellbore; converting the deposited solids mixture into a gravel pack to increase porosity and permeability; removing the bridge from the screen; and producing a reservoir fluid from the formation through the gravel pack and the screen.
45. The method of embodiment 44, wherein the slurry comprises the leak-off control agent and the bridge is formed on the screen during the circulation of the slurry.
46. The method of embodiment 45, wherein the solids mixture comprises three PSD modes to form the bridge on the screen, wherein a first amount of particulates have a first PSD, a second amount of particulates have a second PSD, and a third amount of particulates have a third PSD, wherein the first PSD is larger than the second PSD, and wherein second PSD is larger than the third PSD.
47. The method of embodiment 46, wherein the first amount of particulates comprises 40/80 mesh (178-422 microns) gravel.
48. The method of embodiment 46 or 47, wherein the first PSD is smaller than 40 mesh (422 microns).
49. The method of any one of embodiments 44 to 48, wherein the solids mixture comprises three PSD modes, wherein a first amount of particulates have a first PSD, a second amount of particulates have a second PSD, and a third amount of particulates have a third PSD, wherein the first PSD is from two to ten times larger than the second PSD, and wherein second PSD is from three to ten times larger than the third PSD.
50. The method of any one of embodiments 44 to 49, wherein the leak-off control fluid comprises a spacer fluid introduced into the wellbore.
51. The method of embodiment 50, wherein the slurry is circulated through the wellbore before the screen is positioned in the wellbore, wherein the spacer fluid is positioned in the wellbore above the slurry, and wherein the screen is passed through the spacer fluid in the wellbore and then stabbed into the slurry.
52. The method of embodiment 50, wherein the screen is positioned in the wellbore before the slurry is circulated into an annulus between the screen and the wellbore, and wherein the spacer fluid is circulated into the annulus ahead of the slurry.
53. The method of any one of embodiments 50 to 52, wherein the spacer fluid and slurry are sequentially pumped through a flow passage in the screen to a bottom end of the screen and into the annulus.
54. A method, comprising: combining a carrier fluid, a first amount of particulates, a second amount of particulates, and a third amount of particulates into a slurry; wherein the first amount of particulates have a first average size distribution, the second amount of particulates have a second average size distribution, and the third amount of particulates have a third average size distribution, wherein the first average size distribution is at least three times larger than the second average size distribution, and wherein the second average size distribution is larger than the third average size distribution; wherein at least one of the second amount of particulates and the third amount of particulates comprise a degradable material; positioning a screen in a wellbore in a subterranean formation and circulating the slurry through the wellbore in any order such that the first amount of particulates, the second amount of particulates, and the third amount of particulates form a bridge on a surface of the screen to inhibit fluid entry and a solids pack in an annulus between the screen surface and a surface of the wellbore; and selectively removing from the first amount of particulates at least a portion of the particulates selected from the second amount of particulates, the third amount of particulates and a combination thereof, to increase porosity and permeability in the bridge and the solids pack for fluid flow across the annulus and through the screen.
55. The method of any one of embodiments 1 to 25 or 54, wherein the screen is disposed into the wellbore before the slurry is circulated.
56. The method of any one of embodiments 1 to 25 or 54, wherein the slurry is circulated into the wellbore before the screen is disposed in the wellbore.
57. The method of any one of embodiments 54 to 56, wherein the first amount of particulates and the second amount of particulates have a combined dry packing volume fraction greater than about 0.75, or greater than 0.8.
58. The method of any one of embodiments 54 to 57, wherein the slurry is combined prior to circulation in the wellbore.
59. The method of any one of embodiments 54 to 57, wherein a sum of all particulates in the slurry exceeds thirty pounds per gallon of carrier fluid.
60. The method of any one of embodiments 54 to 57, wherein the second average size distribution is at least three times larger than the third average size distribution.

61. The method of embodiment 60, wherein the total solids volume of the third amount of particulates is greater than the total solids volume of the second amount of particulates.
62. The method of any one of embodiments 54 to 61, wherein the slurry further includes a fourth amount of particulates having a fourth average size distribution, and wherein the third average size distribution is larger than the fourth average size distribution.
63. The method of embodiment 62, wherein the slurry further includes a fifth amount of particulates having a fifth average size distribution, and wherein the fourth average size distribution is larger than the fifth average size distribution.
64. The method of any one of embodiments 54 to 63, wherein the first average size distribution is between about six and ten times larger than the second average size distribution.
65. The method of any one of embodiments 54 to 64, wherein the second average size distribution is between about 1.5 and 15 times larger than the third average size distribution.
66. The method of embodiment 65, wherein the slurry further includes a fourth amount of particulates having a fourth average size distribution, and wherein the third average size distribution is between about 1.25 and 15 times larger than the fourth average size distribution.
67. The method of embodiment 66, wherein the slurry further includes a fifth amount of particulates having a fifth average size distribution, and wherein the fourth average size distribution is between about 1.1 and 15 times larger than the fifth average size distribution.
68. A method, comprising: combining a carrier fluid, a hydrolyzable fines dispersion, a first amount of particulates, a second amount of particulates, a third amount of particulates and a fourth amount of particulates into a slurry; wherein the first amount of particulates have a first average size distribution, the second amount of particulates have a second average size distribution, the third amount of particulates have a third average size distribution, and the fourth amount of particulates have a fourth average size distribution, wherein the first average size distribution is at least three times larger than the second average size distribution, wherein the second average size distribution is at least three times larger than the third average size distribution, and wherein the third average size distribution is at least three times larger than the fourth average size distribution; positioning a screen in a wellbore in a subterranean formation and circulating the slurry through the wellbore in any order such that the first amount of particulates, the second amount of particulates, and the third amount of particulates form a bridge on a surface of the screen to inhibit fluid entry and a solids pack in an annulus between the screen surface and a surface of the wellbore; selectively removing from the first amount of particulates at least a portion of the particulates selected from the second amount of particulates, the third amount of particulates, the fourth amount of particulates, and combinations thereof, to increase porosity and permeability in the bridge and the solids pack for fluid flow across the annulus and through the screen.
69. The method of embodiment 68, wherein the first amount of particulates comprises gravel.
70. The method of embodiment 68 or 69, wherein the first average size distribution is 40 mesh (422 µm) or larger.
71. The method of any one of embodiments 68 to 70, wherein the first amount of particulates comprises 20/40 mesh gravel.
72. The method of any one of embodiments 68 to 71, wherein the slurry further comprises a fifth amount of particulates having a fifth average particle size distribution, wherein the fourth average particle size distribution is at least three times larger than the fifth average particle size distribution.
73. The method of any one of embodiments 68 to 72, wherein the first average size distribution is between 20 and 40 mesh (422-853 µm), the second average size distribution is from 140 µm to 280 µm, the third average size distribution is from 15 to 65 µm, and the fourth average size distribution is from 1 to 10 µm.
74. The method of any one of embodiments 68 to 73, wherein the first average size distribution is from 3 to 15 times larger than the second average size distribution, wherein the second average size distribution is from 3 to 15 times larger than the third average size distribution, and wherein the third average size distribution is from 3 to 15 times larger than the fourth average size distribution.
75. The method of any one of embodiments 68 to 74, wherein at least one of the second amount of particulates and the third amount of particulates comprise a degradable material.
76. The method of any one of embodiments 68 to 75, wherein the hydrolyzable fines dispersion comprises a fluid loss agent to inhibit leak-off from the slurry.
77. The method of embodiment 76, wherein the slurry further comprises a fluid loss agent selected from the group consisting of: latex dispersions, water soluble polymers, submicron particulates, particulates with an aspect ratio higher than 6, and combinations thereof.
78. The method of embodiment 76 or 77, wherein the fluid loss agent comprises crosslinked polyvinyl alcohol microgel.
79. The method of any one of embodiments 76 to 78, wherein the fluid loss agent further comprises AMPS.
80. The method of any one of embodiments 68 to 79, wherein the slurry comprises a solids volume fraction (SVF) from 0.5 to 0.75.
81. The method of any one of embodiments 68 to 80, wherein the total particulates in the slurry have a packed volume fraction (PVF) greater than the SVF.
82. The method of any one of embodiments 1 to 25 or 44 to 81, wherein the slurry is circulated in a horizontal portion of the wellbore from toe to heel.
83. The method of any one of embodiments 1 to 25 or 44 to 82, wherein the slurry is circulated in the wellbore at a pressure less than the fracture pressure.
84. The method of any one of embodiments 1 to 25 or 44 to 83, wherein the slurry is circulated in the wellbore at a rate less than 800 L/min (5 BPM).
85. The method of any one of embodiments 1 to 25 or 44 to 84, wherein the slurry is circulated in the wellbore through a washpipe, wherein a screen-wellbore annulus has a radial thickness relatively less than a radial thickness of a washpipe-screen annulus.
86. A system, comprising: a slurry comprising a hydrolyzable fines dispersion in a carrier fluid suspending a first amount of particulates, a second amount of particulates, and a third amount of particulates; wherein the first amount of particulates have a first average size distribution, the second amount of particulates have a second average size distribution, and the third amount of particulates have a third average size distribution; wherein the first average size distribution is at least three times larger than the second average size distribution, and wherein the second average size distribution is at least 1.5 times larger than the third average size distribution; wherein at least one of the second amount of particulates and the third amount of particulates comprise a degradable material; and a tubing string and a slurry pump to position a screen and circulate the slurry in a wellbore in a subterranean formation in any order such that the first amount of particulates, the second amount of particulates, and the third amount of particulates form a bridge on a surface of the screen and a solids pack in an annulus between the screen surface and a surface of the wellbore, and wherein the degradable material can be selectively removed from the first amount of particulates to increase porosity and permeability in the solids pack for fluid flow across the annulus and through the screen.

87. The system of embodiment 86, wherein the first amount of particulates and the second amount of particulates have a combined dry packing volume fraction greater than about 0.75, or greater than 0.80.

88. The system of embodiment 86 or 87, wherein a sum of all particulates in the slurry exceeds thirty pounds per gallon of carrier fluid.

89. The system of any one of embodiments 86 to 88, wherein the total solids volume of the third amount of particulates is greater than the total solids volume of the second amount of particulates.

90. The system of any one of embodiments 86 to 89, wherein the slurry further includes a fourth amount of particulates having a fourth average size distribution, and wherein the third average size distribution is larger than the fourth average size distribution.

91. The system of embodiment 90, wherein the slurry further includes a fifth amount of particulates having a fifth average size distribution, and wherein the fourth average size distribution is larger than the fifth average size distribution.

92. The system of any one of embodiments 86 to 91, wherein the first average size distribution is between about six and ten times larger than the second average size distribution.

93. A method, comprising: combining a carrier fluid, a solids mixture, a hydrolyzable fines dispersion and a stability additive to form a slurry, wherein the solids mixture comprises a plurality of volume-averaged particle size distribution (PSD) modes such that a packed volume fraction (PVF) exceeds 0.75, or exceeds 0.8, wherein the slurry comprises a solids volume fraction (SVF) less than the PVF of the solids mixture; circulating the slurry into a wellbore to deposit the slurry downhole; terminating the slurry circulation for a period of time, wherein the stability additive inhibits settling of the solids mixture; and thereafter circulating the deposited slurry in contact with a surface of a screen.

94. The method of embodiment 93, wherein the stability additive comprises colloidal or submicron particles.

95. The method of embodiment 94, wherein the submicron particles are selected from the group consisting of silica, γ-alumina, MgO, γ-Fe2O3, and combinations thereof, or from the group consisting of silicates, γ-alumina, MgO, γ-Fe2O3, TiO2, and combinations thereof.

96. The method of any one of embodiments 93 to 95, wherein the stability additive comprises hydratable polymer particles.

97. The method of embodiment 96, wherein the polymer particles have a hydration temperature above 60° C.

98. The method of embodiment 96 or 97, wherein the polymer particles comprise heteropolysaccharide.

99. The method of embodiment 96, 97 or 98, wherein the polymer particles comprise gellan gum.

100. The method of any one of embodiments 93 to 99, wherein the stability additive comprises stabilizing particles having an aspect ratio above 6.

101. The method of embodiment 100, wherein the stabilizing particles having an aspect ratio above 6 are degradable.

102. The method of embodiment 100 or 101, wherein the stabilizing particles having an aspect ratio above 6 comprise flakes, fibers or a combination thereof comprising a polymer or copolymer of lactic acid, glycolic acid, or the combination thereof.

103. The method of any one of embodiments 93 to 102, wherein the circulation of the deposited slurry in contact with the surface of the screen comprises stabbing the screen into the deposited slurry.

104. The method of any one of embodiments 93 to 103, wherein the slurry circulation is terminated to trip a workstring from the wellbore and trip the screen into the wellbore.

105. The method of any one of embodiments 93 to 104, wherein the SVF is from 0.5 to 0.75, or from 0.55 to 0.7, or from 0.56 to 0.68, or from 0.58 to 0.66.

106. The method of any one of embodiments 93 to 105, wherein one of the PSD modes comprises gravel.

107. The method of any one of embodiments 93 to 106, wherein the solids mixture is trimodal.

108. The method of any one of embodiments 93 to 106, wherein the solids mixture is tetramodal.

109. The method of any one of embodiments 93 to 106, wherein the solids mixture is pentamodal.

110. The method of any one of embodiments 93 to 109, further comprising forming the solids mixture in the slurry into a pack in an annulus between the screen and the wellbore.

111. The method of embodiment 110, further comprising converting the pack into a permeable gravel pack.

112. A slurry, comprising: a solids mixture comprising a plurality of volume-averaged particle size distribution (PSD) modes such that a packed volume fraction (PVF) exceeds 0.75, or exceeds 0.8; a carrier fluid in an amount to provide a solids volume fraction (SVF) less than the PVF of the solids mixture; a hydrolyzable fines dispersion; and a stability additive to inhibit settling of the solids mixture.

113. The slurry of embodiment 112, wherein the stability additive comprises colloidal or submicron particles.

114. The slurry of embodiment 113, wherein the submicron particles are selected from the group consisting of silica, γ-alumina, MgO, γ-Fe2O3, and combinations thereof, or from the group consisting of silicates, γ-alumina, MgO, γ-Fe2O3, TiO2, and combinations thereof.

115. The slurry of any one of embodiments 112, 113 or 114, wherein the stability additive comprises hydratable polymer particles.

116. The slurry of embodiment 115, wherein the polymer particles have a hydration temperature above 60° C.

117. The slurry of embodiment 115 or 116, wherein the polymer particles comprise heteropolysaccharide.

118. The slurry of any one of embodiments 115, 116 or 117, wherein the polymer particles comprise gellan gum.

119. The slurry of any one of embodiments 112 to 118, wherein the stability additive comprises stabilizing particles having an aspect ratio above 6.

120. The slurry of embodiment 119, wherein the stabilizing particles having an aspect ratio above 6 are degradable.
121. The slurry of embodiment 119 or 120, wherein the stabilizing particles having an aspect ratio above 6 comprise flakes comprising a polymer or copolymer of lactic acid, glycolic acid, or the combination thereof.
122. The slurry of any one of embodiments 112 to 121, wherein the SVF is from 0.5 to 0.75, or from 0.55 to 0.7, or from 0.56 to 0.68, or from 0.58 to 0.66.
123. The slurry of any one of embodiments 112 to 122, wherein one of the PSD modes comprises gravel.
124. The slurry of any one of embodiments 112 to 123, wherein the solids mixture is trimodal.
125. The slurry of any one of embodiments 112 to 123, wherein the solids mixture is tetramodal.
126. The slurry of any one of embodiments 112 to 123, wherein the solids mixture is pentamodal.
127. The slurry of any one of embodiments 112 to 126, wherein the slurry is stable and flowable for at least 48 hours.
128. A method to stabilize a slurry comprising a solids mixture and a hydrolyzable fines dispersion in a carrier fluid, wherein the solids mixture comprises from three to five volume-averaged particle size distribution (PSD) modes such that a packed volume fraction (PVF) exceeds 0.75, or exceeds 0.8, and wherein the slurry comprises a solids volume fraction (SVF) less than the PVF of the solids mixture, comprising: introducing a stability additive into the slurry, wherein the stability additive is selected from the group consisting of colloidal particles, hydratable polymer particles, particles having an aspect ratio above 6, and combinations thereof.
129. The method of embodiment 128, wherein the stability additive comprises colloidal particles selected from the group consisting of silica, γ-alumina, MgO, γ-Fe2O3, and combinations thereof, or from the group consisting of silicates, γ-alumina, MgO, γ-Fe2O3, TiO2, and combinations thereof.
130. The method of embodiment 128 or 129, wherein the stability additive comprises hydratable polymer particles having a hydration temperature above 60° C.
131. The method of embodiment 128, 129 or 130, wherein the stability additive comprises heteropolysaccharide.
132. The method of any one of embodiments 128 to 131, wherein the stability additive comprises gellan gum.
133. The method of any one of embodiments 128 to 132, wherein the stability additive comprises stabilizing particles having an aspect ratio above 6, wherein the stabilizing particles are degradable.
134. The method of embodiment 133, wherein the stabilizing particles having an aspect ratio above 6 comprise flakes comprising a polymer or copolymer of lactic acid, glycolic acid, or the combination thereof.
135. The method of any one of embodiments 128 to 134, wherein the slurry has an SVF from 0.5 to 0.75, or from 0.55 to 0.7, or from 0.56 to 0.68, or from 0.58 to 0.66.
136. The method of any one of embodiments 128 to 135, wherein one of the PSD modes comprises gravel.
137. The method of any one of embodiments 128 to 136, wherein the slurry is stable and flowable for at least 48 hours following the introduction of the stabilizing additive into the slurry.
138. A method, comprising: positioning a generally cylindrical screen in a wellbore to define an annulus between the screen and the wellbore; and passing a slurry comprising a carrier fluid, a hydrolyzable fines dispersion and a solids mixture through the wellbore, through a passage within the screen to a bottom end of the screen and into the annulus to pack the solids mixture onto an outer surface of the screen; wherein the solids mixture comprises at least two volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or exceeds 0.8.
139. The method of embodiment 138, wherein the screen positioning employs a workstring comprising drill pipe, packer assembly, and a washpipe, and further comprising connecting the washpipe to a bottom end of the screen, pumping the slurry down the drill pipe through the washpipe and out of the bottom end into the annulus, and further comprising, after pumping the slurry into the annulus, setting the packer and removing the washpipe.
140. The method of embodiment 138 or 139, wherein the annulus has a radial thickness (wellbore inside radius minus screen outside radius) less than 25 mm.
141. The method of any one of embodiments 138 to 140, wherein the slurry is circulated in the annulus at a pressure less than the fracture pressure, or at a rate of less than 800 L/min (5 BPM).
142. The method of embodiment 138, wherein the screen positioning employs a workstring comprising drill pipe, packer assembly, washpipe, the screen and an end cap comprising a port to allow the washpipe to connect to a bottom of the assembly, and further comprising setting the packer, pumping the slurry down the drill pipe through the washpipe and out of the bottom of the assembly into the annulus to build up pressure in the annulus greater than a fracture pressure to fracture the formation, and thereafter removing the drill pipe and the washpipe from the wellbore.
143. The method of embodiment 138, wherein the screen positioning employs a production assembly comprising production tubing, the screen and a packer, wherein the screen is coated with a degradable material to inhibit inflow, wherein following the screen positioning, the slurry is pumped down the production tubing through the central flow passage, out of the distal end into the annulus, and further comprising, after pumping the slurry into the annulus, setting the packer, degrading the degradable material for inflow into the screen and producing reservoir fluid through the production tubing.
144. The method of embodiment 138, wherein the screen positioning employs a production assembly comprising production tubing, the screen and a packer, wherein the screen contains a degradable material within a base pipe to inhibit inflow, wherein following the screen positioning, the slurry is pumped down the production tubing through the central flow passage, out of the distal end into the annulus, and further comprising, after pumping the slurry into the annulus, setting the packer, degrading the degradable material for inflow and producing reservoir fluid through the production tubing.
145. The method of embodiment 138, wherein the screen positioning employs a production assembly comprising production tubing, the screen, a packer, and a mechanical inflow device to selectively inhibit or allow inflow, wherein following the screen positioning, the slurry is pumped down the production tubing through the central flow passage, out of the distal end into the annulus, and further comprising, after pumping the slurry into the annulus, setting the packer, activating the inflow device to allow inflow into the screen and producing reservoir fluid through the production tubing.
146. The method of embodiment 145 wherein the inflow device is remotely activated.
147. The method of embodiment 145 or 146, wherein the inflow device is activated by a timing device at a prescribed time after the production assembly is run in hole.
148. The method of any one of embodiments 138 to 147, further comprising setting a chemical packer in an annulus between the wellbore and a tubing connected to the screen.
149. The method of embodiment 148, wherein the chemical packer is run ahead of the slurry.
150. The method of any one of embodiments 138 to 149, further comprising setting a plurality of spaced chemical packers in the screen-wellbore annulus and optionally in an annulus between the wellbore and a tubing connected to the screen, to create zonal isolation.
151. The method of any one of embodiments 148 to 150, wherein the chemical packer is introduced to the tubing-wellbore annulus through a diversion port above the screen.
152. The method of embodiment 138, wherein the screen positioning employs a drilling assembly comprising a drill string, the screen, a liner packer and a drilling and measurement assembly comprising a drill bit, the screen positioning comprising drilling a final length of hole to place the screen, the slurry circulation comprising pumping the slurry through the drilling assembly out of the drill bit and into the annulus, and further comprising, after pumping the slurry into the annulus, setting the liner packer, removing the drill string and abandoning the bit downhole.
153. The method of embodiment 152, further comprising pumping a plugging material to follow the slurry and seal off a bottom of the wellbore.
154. The method of embodiment 138, wherein the screen positioning employs a drilling assembly comprising a drill string, the screen, a liner packer and a drilling and measurement assembly comprising a drill bit, the screen positioning comprising drilling a final length of hole to place the screen, and further comprising setting the packer, pumping the slurry through the drilling assembly out of the drill bit and into the annulus to build up pressure in the annulus greater than a fracture pressure to fracture the formation, removing the drill string and abandoning the bit downhole.
155. The method of embodiment 138, wherein the screen positioning employs a drilling assembly comprising a drill string, the screen and a drilling and measurement assembly comprising a drill bit, the screen positioning comprising drilling a final length of hole to place the screen, the slurry circulation comprising pumping a chemical packer ahead of the slurry through the drilling assembly out of the drill bit and into the annulus, and further comprising, after pumping the chemical packer and the slurry into the annulus, setting the chemical packer, removing the drill string and abandoning the bit downhole.
156. The method of embodiment 155, further comprising pumping cement ahead of the chemical packer to place cement around any free casing.
157. The method of any one of embodiments 138 to 156, further comprising transforming the packed solids mixture into a permeable gravel pack.
158. A method, comprising: combining a carrier fluid, a hydrolyzable fines dispersion and a solids mixture to form a slurry, wherein the solids mixture comprises a plurality of volume-averaged particle size distribution (PSD) modes such that a packed volume fraction (PVF) exceeds 0.75, or exceeds 0.8, wherein the solids mixture comprises at least a proppant PSD mode and a non-hydrolyzable fines PSD mode; circulating the slurry through a wellbore to form a proppant pack from depositing the solids mixture in one or both of a fracture in a formation and an annulus between a screen and the wellbore; contacting non-hydrolyzable fines in the pack with a dispersant; passing fluid through the pack to remove non-hydrolyzable fines from the pack.
159. The method of embodiment 158, wherein the dispersant is present in the slurry.
160. The method of embodiment 158, wherein contacting the non-hydrolyzable fines with the dispersant comprises displacing the carrier fluid from the proppant pack with another fluid comprising the dispersant.
161. The method of any one of embodiments 158 to 160, wherein contacting the non-hydrolyzable fines with the dispersant comprises circulating a fluid comprising the dispersant in the wellbore after forming the pack.
162. The method of any one of embodiments 158 to 161, wherein contacting the non-hydrolyzable fines with the dispersant comprises spotting a fluid comprising the dispersant in contact with the pack after forming the pack.
163. The method of any one of embodiments 158 to 162, wherein the dispersant comprises a polyelectrolyte.
164. The method of any one of embodiments 158 to 163, wherein the dispersant comprises polysulfonate, polycarboxylate or a combination thereof.
165. The method of any one of embodiments 158 to 164, wherein the dispersant comprises lignosulfonate, polymelamine sulfonate, polystyrene sulfonate, polynaphthalene sulfonate or a combination thereof.
166. The method of any one of embodiments 158 to 165, wherein the dispersant comprises polynaphthalene sulfonate.
166A. The method of any one of embodiments 158 to 166, wherein the dispersant comprises polyacrylate having a weight average molecular weight less than 10,000 Daltons
167. The method of any one of embodiments 158 to 166A, wherein the dispersant comprises an anionic, cationic, amphoteric or zwitterionic surfactant.
168. The method of any one of embodiments 158 to 167, wherein the dispersant comprises a nonionic surfactant and the carrier fluid optionally comprises brine.
169. The method of any one of embodiments 158 to 168, wherein a weight ratio of dispersant to fines is from about 1:500 to about 10:90.
170. The method of any one of embodiments 158 to 169, wherein the non-hydrolyzable fines comprise silica.
171. The method of any one of embodiments 158 to 170, wherein the non-hydrolyzable fines comprise calcium carbonate.
172. The method of any one of embodiments 158 to 171, wherein the non-hydrolyzable fines are agglomerated in the slurry.
173. The method of any one of embodiments 158 to 172, wherein the slurry comprises a volume fraction of solids of from about 0.45 up to the PVF.
174. The method of any one of embodiments 158 to 173, wherein the slurry comprises a volume fraction of carrier fluid from (1−PVF) to 0.55, or to 2.5*(1−PVF).

175. The method of any one of embodiments 158 to 174, wherein the proppant PSD mode is from 100 to 2000 microns and the non-hydrolyzable fines PSD mode is from 1 to 20 microns.

176. The method of any one of embodiments 158 to 175, wherein the proppant PSD mode is from 18 to 900 times larger than the non-hydrolyzable fines PSD mode.

177. The method of any one of embodiments 158 to 176, wherein the slurry further comprises one or more intermediate PSD modes selected from the group consisting of PSD modes from 2 to 60 times smaller than the proppant PSD mode, PSD modes from 1.1 to 60 times larger than the non-hydrolyzable fines PSD mode, and combinations thereof.

178. The method of embodiment 177, wherein at least one of the intermediate PSD modes is degradable, and further comprising degrading the at least one degradable intermediate PSD mode after forming the pack.

179. The method of any one of embodiments 177 to 178, wherein the intermediate PSD modes include a relatively larger PSD mode and a relatively smaller intermediate PSD mode, wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the non-hydrolyzable fines PSD mode.

179A. The method of embodiment 179, further comprising a middle intermediate PSD mode from 1.5 to 4 times smaller than the larger intermediate PSD mode and 1.25 to 2.5 times larger than the smaller PSD mode.

180. The method of embodiment 179 or 179A, wherein the larger intermediate PSD mode is degradable, and further comprising degrading the larger intermediate PSD mode after forming the pack.

181. The method of any one of embodiments 158 to 180, wherein at least 70 percent of the fines are removed from the pack.

182. The method of any one of embodiments 158 to 181, further comprising producing reservoir fluid through the cleaned pack into the wellbore.

183. The method of any one of embodiments 158 to 182, comprising gravel packing wherein the slurry is circulated in the wellbore at a rate less than about 800 L/min (5 BPM), or to avoid fracturing the formation.

184. The method of any one of embodiments 158 to 183, wherein the carrier fluid is a low viscosity fluid free of viscosifier or comprising viscosifier in an amount less than 2.4 g of viscosifier per liter of carrier fluid (20 lb/1000 gal).

185. A system, comprising: a well bore in fluid communication with a subterranean formation; a gravel packing slurry comprising a carrier fluid, a hydrolyzable fines dispersion and a solids mixture, wherein the solids mixture comprises a plurality of volume-averaged particle size distribution (PSD) modes such that a packed volume fraction (PVF) exceeds 0.75, or exceeds 0.8, wherein the solids mixture comprises at least a proppant PSD mode and a non-hydrolyzable fines PSD mode; a pump to circulate the slurry in the wellbore to deposit the solids mixture and form a proppant pack in one or both of a fracture in the formation and an annulus between a screen and the formation; and a dispersant source effective to facilitate fines flowback from the pack.

186. The system of embodiment 185, wherein the dispersant is present in the slurry.

187. The system of embodiment 185 or 186, wherein the dispersant source comprises a dispersant circulation or spotting fluid.

188. The system of any one of embodiments 185 to 187, wherein the dispersant comprises a polyelectrolyte.

189. The system of any one of embodiments 185 to 188, wherein the dispersant comprises polysulfonate, polycarboxylate or a combination thereof.

190. The system of any one of embodiments 185 to 189, wherein the dispersant comprises a lignosulfonate, polymelamine sulfonate, polystyrene sulfonate, polynaphthalene sulfonate or a combination thereof.

191. The system of any one of embodiments 185 to 190, wherein the dispersant comprises polynaphthalene sulfonate.

191A. The system of any one of embodiments 185 to 191, wherein the dispersant comprises polyacrylate having a weight average molecular weight less than 10,000 Daltons 192. The system of any one of embodiments 185 to 191A, wherein the dispersant comprises an anionic, cationic, amphoteric or zwitterionic surfactant.

193. The system of any one of embodiments 185 to 192, wherein the dispersant comprises a nonionic surfactant and the carrier fluid optionally comprises brine.

194. The system of any one of embodiments 185 to 193, wherein a weight ratio of dispersant to non-hydrolyzable fines is from about 1:500 to about 10:90.

195. The system of any one of embodiments 185 to 194, wherein the non-hydrolyzable fines comprise silica.

196. The system of any one of embodiments 185 to 195, wherein the non-hydrolyzable fines comprise calcium carbonate.

197. The system of any one of embodiments 185 to 196, wherein the non-hydrolyzable fines are agglomerated in the slurry.

198. The system of any one of embodiments 185 to 197, wherein the slurry comprises a volume fraction of solids of from about 0.45 up to the PVF.

199. The system of any one of embodiments 185 to 198, wherein the slurry comprises a volume fraction of carrier fluid from (1−PVF) to 0.55, or up to 2.5*(1−PVF).

200. The system of any one of embodiments 185 to 199, wherein the proppant PSD mode is from 100 to 2000 microns and the non-hydrolyzable fines PSD mode is from 1 to 20 microns.

201. The system of any one of embodiments 185 to 200, wherein the proppant PSD mode is from 18 to 900 times larger than the non-hydrolyzable fines PSD mode.

202. The system of any one of embodiments 185 to 201, wherein the slurry further comprises one or more intermediate PSD modes selected from the group consisting of: PSD modes from 2 to 60 times smaller than the proppant PSD mode, PSD modes from 1.1 to 60 times larger than the fines PSD mode, and combinations thereof.

203. The system of embodiment 202, wherein at least one of the intermediate PSD modes is degradable.

204. The system of embodiment 202 or 203, wherein the intermediate PSD modes include a relatively larger intermediate PSD mode and a relatively smaller intermediate PSD mode, or wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the non-hydrolyzable fines PSD mode.

205. The system of embodiment 204, further comprising a middle intermediate PSD mode from 1.5 to 4 times smaller than the larger intermediate PSD mode and 1.25 to 2.5 times larger than the smaller PSD mode.
206. The system of embodiment 204 or 205, wherein the relatively larger intermediate PSD mode is degradable.
207. The system of any one of embodiments 185 to 206, wherein the carrier fluid is a low viscosity fluid free of viscosifier or comprising viscosifier in an amount less than 2.4 g of viscosifier per liter of carrier fluid (20 lb/1000 gal).
208. A slurry, comprising: a solids mixture and a hydrolyzable fines dispersion in a carrier fluid, wherein the solids mixture comprises first, second, third and fourth volume-averaged particle size distribution (PSD) modes such that a packed volume fraction (PVF) of the solids mixture is greater than 0.75, or greater than 0.80; a solids volume fraction (SVF) of the slurry less than the PVF of the solids mixture; wherein the first PSD mode is at least three times larger than the second PSD mode, the second PSD mode is larger than the third PSD mode, and the third PSD mode is larger than the fourth PSD mode, and wherein at least one of the second and third PSD modes is less than 3 times larger than the respective third or fourth PSD mode.
209. The slurry of embodiment 208, wherein the solids mixture further comprises a fifth PSD mode, wherein the fourth PSD mode is larger than the fifth PSD mode and optionally less than 3 times larger than the fifth PSD mode.
210. The slurry of embodiment 208, wherein the first PSD mode is from 3 to 10 times larger than the second PSD mode (or about 5 to about 7, or about 5.4 to about 6.9, or about 5.6 to about 6.6 times larger than the second PSD mode), the second PSD mode is from 1.5 to 4 times larger than the third PSD mode (or from about 2 to about 2.4 times larger than the third PSD mode), and the third PSD mode is at least 1.25 times larger than the fourth PSD mode.
211. The slurry of embodiment 210, wherein the solids mixture further comprises a fifth PSD mode, wherein the fourth PSD mode is at least 1.1 times larger than the fifth PSD mode.
212. The slurry of any one of embodiments 208 to 211, wherein the first PSD mode is from about 422 microns up to about 853 microns (20/40 mesh), the second PSD mode is from about 60 microns up to about 180 microns (or from about 100 microns up to about 150 microns), the third PSD mode is from about 25 microns up to about 70 microns (or from about 40 microns up to about 60 microns), and the fourth PSD mode is from about 1 micron up to about 40 microns.
213. The slurry of embodiment 212, wherein the solids mixture further comprises a fifth PSD mode smaller than the fourth PSD mode, wherein the fifth PSD mode is from about 1 micron up to about 25 microns.
214. The slurry of any one of embodiments 208 to 213, wherein the solids mixture further comprises a fifth PSD mode smaller than the fourth PSD mode, wherein the fifth PSD mode is at least 1 micron and the first PSD mode is from about 422 microns (40 mesh) up to about 853 microns (20 mesh).
215. The slurry of any one of embodiments 208 to 214, wherein the second PSD mode comprises a total SVF from 5 to 30 percent (or from 10 to 20 percent, or from 10 to 15 percent), the third PSD mode comprises a total SVF from 3 to 20 percent (or from 3 to 10 percent), and the fourth PSD mode comprises a total SVF from 5 to 40 percent (or from 10 to 30 percent), based on a total SVF of the first PSD mode.
216. The slurry of embodiment 215, wherein the solids mixture further comprises a fifth PSD mode smaller than the fourth PSD mode, wherein the fifth PSD mode comprises a total SVF from 1 to 40 percent, based on a total SVF of the first PSD mode.
217. The slurry of any one of embodiments 208 to 216, wherein the second PSD mode comprises a total SVF from 5 to 30, or 10 to 20, percent of a total SVF of the first PSD mode; the third PSD mode comprises a total SVF from 10 to 100, or 30 to 60, percent of the total SVF of the second PSD mode; and the fourth PSD mode comprises a total SVF from 10 to 500, or 100 to 400, percent of the total SVF of the third PSD mode.
218. The slurry of embodiment 217, wherein the solids mixture further comprises a fifth PSD mode, wherein the fifth PSD mode comprises a total SVF from 20 to 100, or 30 to 80, percent of the total SVF of the fourth PSD mode.
219. The slurry of any one of embodiments 208 to 218, wherein the first PSD mode comprises a total SVF from 60 to 80 percent of the total SVF of the solids mixture.
220. The slurry of embodiment 208, wherein the first PSD mode is between 20 and 40 mesh (422-853 µm), the second PSD mode is from about 100 µm to about 280 µm and, the third PSD mode is from about 15 µm to 60 µm, and the fourth PSD mode is from about 1 µm to 25 µm.
221. The slurry of embodiment 220, further comprising a fifth PSD mode wherein the fourth PSD mode is larger than the fifth PSD mode.
222. The slurry of any one of embodiments 208 to 221, wherein the hydrolyzable fines dispersion comprises a fluid loss agent to inhibit leak-off from the slurry.
223. The slurry of embodiment 222, wherein the fluid loss agent further comprises one selected from the group consisting of: latex dispersions, water soluble polymers, submicron particulates, particulates with an aspect ratio higher than 6, and combinations thereof.
224. The slurry of embodiment 222 or 223, wherein the fluid loss agent further comprises crosslinked polyvinyl alcohol microgel.
225. The slurry of any one of embodiments 222 to 224, wherein the fluid loss agent further comprises AMPS.
226. The slurry of any one of embodiments 208 to 225, wherein the solids mixture comprises a PVF of at least 0.85, 0.90, 0.95, 0.96, 0.97, 0.98 or 0.99.
227. The slurry of any one of embodiments 208 to 226, wherein at least one of the second, third or fourth PSD modes comprises a degradable material.
228. The slurry of embodiment 227, wherein the solids mixture comprises a reactive material.
229. The slurry of any one of embodiments 208 to 226, wherein the solids mixture further comprises a fifth PSD mode, wherein at least one of the second, third, fourth or fifth PSD modes comprises a degradable material.
230. The slurry of embodiment 229, wherein the solids mixture comprises a reactive material.
231. A method, comprising: combining a solids mixture and a carrier fluid to form the slurry of any one of embodiments 208 to 230; and positioning a screen in a wellbore and circulating the slurry through the wellbore in any order such that the solids mixture is deposited between the screen and the wellbore.
232. The method of embodiment 231, wherein the slurry is circulated in a horizontal portion of the wellbore from toe to heel.

233. The method of any one of embodiments 231 to 232, wherein the slurry is circulated in the wellbore at a pressure less than the fracture pressure.
234. The method of any one of embodiments 231 to 233, wherein the slurry is circulated in the wellbore at a rate of less than 800 L/min (5 BPM).
235. The method of claim any one of embodiments 231 to 234, wherein the slurry is circulated in the wellbore through a washpipe, wherein a screen-wellbore annulus has a radial thickness relatively less than a radial thickness of a washpipe-screen annulus.
236. The method of any one of embodiments 231 to 256, wherein the slurry is circulated in a horizontal portion of the wellbore from toe to heel.
237. The method of any one of embodiments 231 to 257, wherein the hydrolyzable fines and the first, second, third, fourth and any other particulates in the slurry are formed into a pack in an annulus between the screen and the wellbore.
238. The method of embodiment 258, further comprising converting the pack into a permeable gravel pack comprising the first amount of particulates.
239. A system, comprising: a well bore in fluid communication with a subterranean formation; a gravel packing slurry comprising the slurry of any one of embodiments 208 to 230; a pump to circulate the slurry in the wellbore and a workstring to position a screen in the wellbore in either order to deposit the slurry in one or both of a fracture in the formation and an annulus between the screen and the formation; and means for converting the deposited slurry to a gravel pack.
240. The system of embodiments 239, further comprising a washpipe to circulate the slurry through the screen, wherein a screen-wellbore annulus has a radial thickness relatively less than a radial thickness of a washpipe-screen annulus.
241. A system, comprising: a well bore in fluid communication with a subterranean formation; a gravel packing slurry comprising a carrier fluid, a hydrolyzable fines dispersion and a solids mixture, wherein the solids mixture comprises a plurality of volume-averaged particle size distribution (PSD) modes such that a packed volume fraction (PVF) exceeds 0.75, or exceeds 0.8, wherein the solids mixture comprises at least a proppant PSD mode, a non-hydrolyzable fines PSD mode, and one or more intermediate PSD modes selected from the group consisting of: PSD modes from 2 to 60 times smaller than the proppant PSD mode, PSD modes from 1.1 to 60 times larger than the non-hydrolyzable fines PSD mode, and combinations thereof, wherein any two of the proppant, intermediate and non-hydrolyzable fines PSD modes have a size ratio less than 3; and a pump to circulate the slurry in the wellbore to deposit the solids mixture and form a proppant pack in one or both of a fracture in the formation and an annulus between a screen and the formation.
242. The system of embodiment 241, wherein the intermediate PSD modes include a relatively larger intermediate PSD mode and a relatively smaller intermediate PSD mode, or wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the non-hydrolyzable fines PSD mode.
243. The system of embodiment 241, further comprising a middle intermediate PSD mode from 1.5 to 4 times smaller than the larger intermediate PSD mode and 1.25 to 2.5 times larger than the smaller PSD mode.
244. The system of embodiment 242 or 243, wherein at least one intermediate PSD mode is degradable, for example, the relatively larger PSD mode.

245. A method, comprising: combining a carrier fluid, a hydrolyzable fines dispersion and a solids mixture to form a slurry, wherein the solids mixture comprises a plurality of volume-averaged particle size distribution (PSD) modes such that a packed volume fraction (PVF) exceeds 0.75, or exceeds 0.8, wherein the solids mixture comprises at least a proppant PSD mode, a non-hydrolyzable fines PSD mode, and one or more intermediate PSD modes selected from the group consisting of: PSD modes from 2 to 60 times smaller than the proppant PSD mode, PSD modes from 1.1 to 60 times larger than the non-hydrolyzable fines PSD mode, and combinations thereof, wherein any two of the proppant, intermediate and fines PSD modes have a size ratio less than 3; and circulating the slurry through a wellbore to form a proppant pack from depositing the solids mixture in one or both of a fracture in a formation and an annulus between a screen and the wellbore.
246. The method of embodiment 245, wherein the intermediate PSD modes include a relatively larger intermediate PSD mode and a relatively smaller intermediate PSD mode, or wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the non-hydrolyzable fines PSD mode.
247. The method of embodiment 246, further comprising a middle intermediate PSD mode from 1.5 to 4 times smaller than the larger intermediate PSD mode and 1.25 to 2.5 times larger than the smaller PSD mode.
248. The method of embodiment 246 or 247, wherein at least one intermediate PSD mode is degradable, for example the relatively larger PSD mode.
249. A treatment fluid, comprising a solids mixture slurried in a carrier fluid; and a fluid loss control agent comprising a hydrolyzable fines dispersion in intimate admixture therewith.
250. The treatment fluid of embodiment 249, wherein the Apollonianistic solids mixture comprises proppant.
251. The treatment fluid of embodiment 249 or embodiment 250, wherein the solids mixture is Apollonianistic.
251A. The treatment fluid of any one of embodiments 249 to 251, wherein the solids mixture comprises at least one particle size distribution mode comprising degradable particles.
251B. The treatment fluid of embodiment 251A, wherein the at least one particle size distribution mode comprising degradable particles has a particle size distribution greater than 20 microns.
252. The treatment fluid of embodiment 251A or 251B, wherein the degradable particles comprise a polymer or copolymer of lactic acid, glycolic acid, or the combination thereof.
253. The treatment fluid of any one of embodiments 249 to 252, wherein the hydrolyzable fines dispersion comprises polyester particles having a particle size distribution mode from 0.1 to 20 microns.
254. The treatment fluid of any one of embodiments 249 to 253, wherein the hydrolyzable fines dispersion comprises polyester particles and a surfactant.
255. The treatment fluid of any one of embodiments 249 to 254, wherein the hydrolyzable fines dispersion comprises a polymer or copolymer of lactic acid, glycolic acid, or the combination thereof, treated with a nonionic or anionic surfactant.
256. The treatment fluid of any one of embodiments 249 to 255, wherein the hydrolyzable fines dispersion comprises a surfactant and optionally a plasticizer.
257. The treatment fluid of any one of embodiments 249 to 256, further comprising submicron particles selected from silica, γ-alumina, MgO, γ-Fe2O3, and combinations thereof, or from the group consisting of silicates, γ-alumina, MgO, γ-Fe2O3, TiO2, and combinations thereof.

258. The treatment fluid of any one of embodiments 249 to 257, further comprising from 1 to 15 parts per 100 parts by weight carrier fluid of one or more of a dispersant, a surfactant (including or in addition to any surfactant in the hydrolyzable fines dispersion), a viscosifier, a defoamer, or a combination thereof.

259. The treatment fluid of any one of embodiments 249 to 258, wherein the solids mixture further comprises an acid-reactive fines particle size distribution mode.

260. A treatment fluid, comprising: an Apollonianistic solids mixture comprising proppant, degradable particles and submicron particles, slurried in an aqueous carrier fluid, wherein the degradable particles comprise a polymer or copolymer of lactic acid, glycolic acid, or a combination thereof, wherein the degradable particles comprise first and second particle size distribution modes wherein the first particle size distribution mode is from 1.5 to 2.5 times larger than the second particle size distribution mode and wherein the first PSD mode is smaller than the proppant PSD mode, and wherein the treatment fluid comprises from 0 to 3 parts by weight dispersant, from 0 to 3 parts by weight surfactant, from 0 to 3 parts by weight defoamer, and from 0 to 15 parts by weight viscosifier, per 100 parts by weight carrier fluid; and in intimate admixture therewith, a fines emulsion comprising 1 to 5 micron polylactide particles, an anionic surfactant and optionally a plasticizer.

261. The treatment fluid of embodiment 260, wherein the Apollonianistic solids mixture further comprises an acid-reactive fines having particle size distribution mode smaller than the second PSD mode and comprising from 1 to 20 microns.

262. A composition, comprising: a carrier fluid and dispersed therein from 5 to 100 g per 100 ml carrier fluid of a fluid loss control system comprising a mixture of surfactant-treated hydrolyzable fines having a particle size distribution between 1 and 10 microns, and of submicron particles.

263. The composition of embodiment 262, wherein the hydrolyzable fines comprise a polymer or copolymer of lactic acid, glycolic acid, or the combination thereof, emulsified or stabilized with a nonionic or anionic surfactant.

264. The composition of embodiment 262 or 263, wherein the submicron particles comprise silica, γ-alumina, MgO, γ-Fe2O3, or a combination thereof, or from the group consisting of silicates, γ-alumina, MgO, γ-Fe2O3, TiO2, and combinations thereof.

265. The composition of any one of embodiments 262 to 264, wherein the carrier fluid is aqueous, the hydrolyzable fines comprise polylactic acid having a particle size distribution between about 1 and about 5 microns emulsified or stabilized with an anionic surfactant, and the submicron particles comprise silica, γ-alumina, MgO, γ-Fe2O3, or a combination thereof, or from the group consisting of silicates, γ-alumina, MgO, γ-Fe2O3, TiO2, and combinations thereof, and wherein a weight ratio of the hydrolyzable fines to submicron particles is from 1:3 to 3:1.

266. A method, comprising: mixing an aqueous hydrolyzable polyester emulsion and a carrier fluid to form a treatment fluid, and circulating the treatment fluid into a wellbore.

266A. The method of embodiment 266 wherein the aqueous hydrolyzable polyester emulsion comprises polyester particles having a particle size distribution between 0.1 and 10 microns 267. The method of embodiment 266 or 266A, further comprising introducing Apollonianistic solids into the treatment fluid.

268. The method of any one of embodiments 266 to 267, further comprising introducing proppant into the treatment fluid.

269. The method of embodiment 268, further comprising forming a pack of the proppant downhole.

270. The method of embodiment 269, wherein the pack comprises proppant and at least one particle size distribution mode comprising degradable particles, and further comprising removing the degradable particles from the pack to form a permeable proppant pack.

270A. The method of embodiment 270, wherein the at least one particle size distribution mode comprising degradable particles is smaller than the proppant and larger than 20 microns.

271. The method of embodiment 270 or 270A, further comprising producing or injecting a fluid through the permeable proppant pack.

272. The method of embodiment 270, embodiment 270A or embodiment 271, wherein the degradable particles comprise a polymer or copolymer of lactic acid, glycolic acid, or the combination thereof.

273. The method of any one of embodiments 270 to 272, wherein the permeable proppant pack comprises a gravel pack in an annulus between a screen and the wellbore.

274. The method of any one of embodiments 270 to 273, wherein the permeable proppant pack is disposed in a fracture.

275. A method to inhibit fluid loss from a treatment fluid, comprising introducing an aqueous hydrolyzable polyester fines emulsion into the treatment fluid and introducing the treatment fluid into a wellbore.

276. A method to stabilize and inhibit fluid loss from a treatment fluid, comprising introducing submicron particles and an aqueous polylactic acid emulsion into the treatment fluid.

277. A method, comprising fracturing a formation with a treatment fluid comprising aqueous hydrolyzable polyester fines emulsion comprising polyester particles having a particle size distribution between 0.1 and 10 microns dispersed in a carrier fluid.

278. The method according to any one of embodiments 275 to 277, wherein the treatment fluid comprises a slurry comprising an Apollonianistic solids mixture.

EXAMPLES

Example 1

In this example, the effects of varying the size and concentration of the smaller particles in a 4-mode PSD system were investigated. A series of syringe fluid loss tests were performed where the particle size and concentration of the second particle were varied. In these tests, the first particle was 20/40 CARBOLITE proppant (average diameter 770 μm), and the other particles were made of silica. The size and concentration of the second particle were varied, the third particle had an average diameter of 32 μm and the fourth particle had an average diameter of 3 μm. A dry blend was made using the four particles by mixing 50 g CARBOLITE, x g of the second particle, 5 g of the third particle and 10 g of the fourth particle, where x was 5.5 g, 7 g, 9 g or 12 g. The dry blend was made into slurry by adding 10.5 ml of DI water. Table 1 lists the fluid loss observed in the syringe tests for the different slurries.

TABLE 1

Slurry Composition and Syringe Fluid Loss Data for Runs 1-1 to 1-4
(Second Particle Size and Concentration Varied)

| Second Particle | | | Run 1-1 | Run 1-2 | Run 1-3 | Run 1-4 |
|---|---|---|---|---|---|---|
| Concentration, g (P1/P2/P3/P4) → | | | 50/5.5/5/10 | 50/7/5/10 | 50/9/5/10 | 50/12/5/10 |
| Size (P1/P2/P3/P4 = 770/x/32/3, μm) | | | | | | |
| Mesh | Size Range, μm | Average Size, μm | LEAK-OFF (mL) | | | |
| −50/+60 | 250-297 | 274 | ND | ND | 5.90 | ND |
| −60/+70 | 210-250 | 230 | ND | ND | 5.38 | 3.1 |
| −70/+100 | 149-210 | 180 | 4.32 | 2.13 | 1.92 | 0.72 |
| −100/+140 | 105-149 | 127 | 1.14 | 0.42 | 0.72 | 0.26 |
| −140/+170 | 88-105 | 96.5 | 1.68 | 0.60 | 0.31 | 0.2 |
| −170/+200 | 74-88 | 81 | 4.65 | 4.80 | 0.70 | 0.3 |
| −200/+230 | 63-74 | 68.5 | ND | 6.35 | 0.65 | 0.4 |
| −230/+270 | 53-63 | 58 | ND | ND | 3.28 | 0.57 |
| −270/+400 | 37-53 | 45 | ND | ND | 5.50 | 3.35 |

ND = Not Determined

Figure 4:
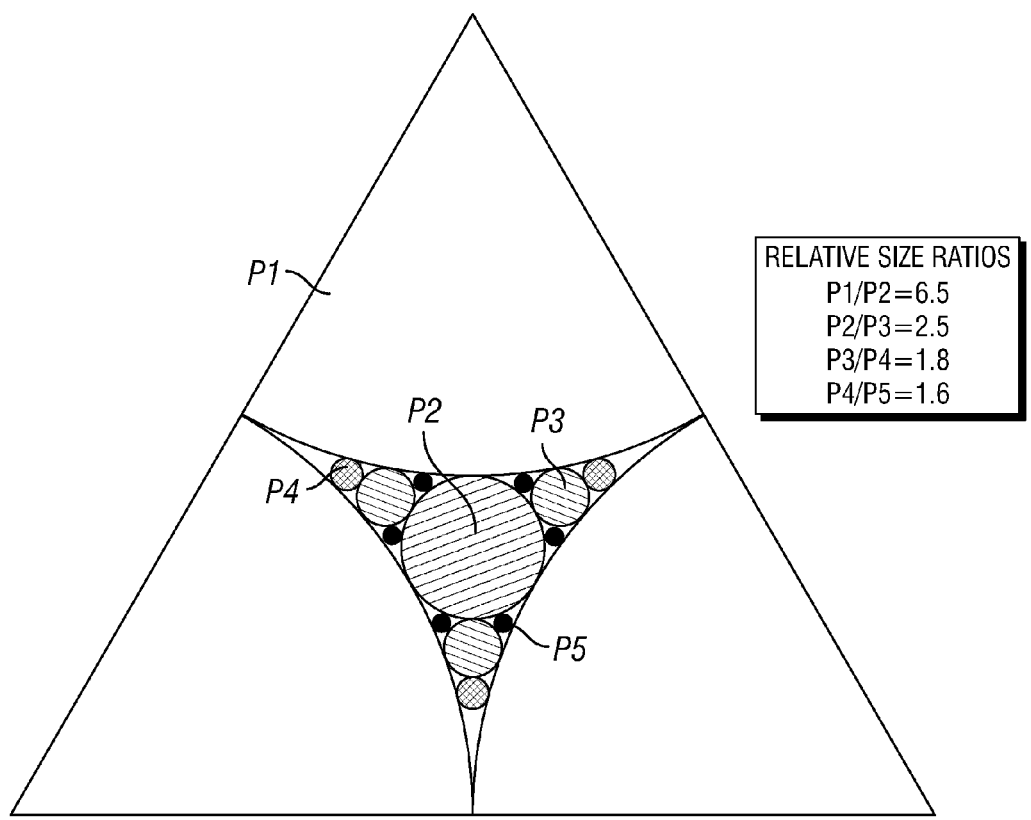
FIG. 4 illustrates a tetramodal Apollonian particle packing model based on the Descartes circle theorem involving mutually tangent circles, according to an embodiment as discussed in Example 1.

The data are plotted in FIG. 4 as a function of the second particle size. As illustrated in FIG. 4, high concentrations of the second particle relative to the first particle can allow a broader range of the average size of the second particle to be used to reduce leak-off. However, a carefully selected second particle size can allow lower concentrations of the second particle to be used, potentially facilitating clean up or removal of the smaller particles to convert the packed particles from the slurry into a porous, permeable gravel/or proppant pack. For example, at 12 g of the second particle per 50 g 20/40 CARBOLITE first particles, an average second particle size anywhere between 60 μm and 180 μm effectively bridged the gap between the 20/40 CARBOLITE particles leading to low leak-off. As the concentration of the second particle was reduced to 5.5 g, however, the second particles in the average size range between 100 μm and 150 μm controlled leak-off, with an optimum particle size of about 127 μm+/−10 or 15 μm. This example shows that the ratio of the average sizes of the first to second particle in this example is beneficially within the range of about 770/(127+15)~5.4 to about 770/(127−15)~6.9, or from about 5.6 to about 6.6, or equal to about 770/127~6.06.

Another series of tests were then run using the 127 μm second particle while varying the size of the third particle as shown in Table 2 below.

TABLE 2

Slurry Composition and Syringe Fluid Loss Data
for Run 1-5 (Third Particle Size Varied)

| Third Particle | | | Run 1-5 |
|---|---|---|---|
| Concentration, g (P1/P2/P3/P4) | | | 50/7/3/10 |
| Size (P1/P2/P3/P4 = 770/127/x/3, μm) | | | |
| Mesh | Size Range, μm | Average Size, μm | LEAK-OFF (mL) |
| −140/+170 | 88-105 | 96.5 | 7.78 |
| −200/+230 | 63-74 | 68.5 | 1.3 |
| −230/+270 | 53-63 | 58 | 0.58 |
| −270/+400 | 37-53 | 45 | 0.97 |
| | 27-37 | 32 | 1.55 |
| | | 11 | 7.84 |

Figure 5:
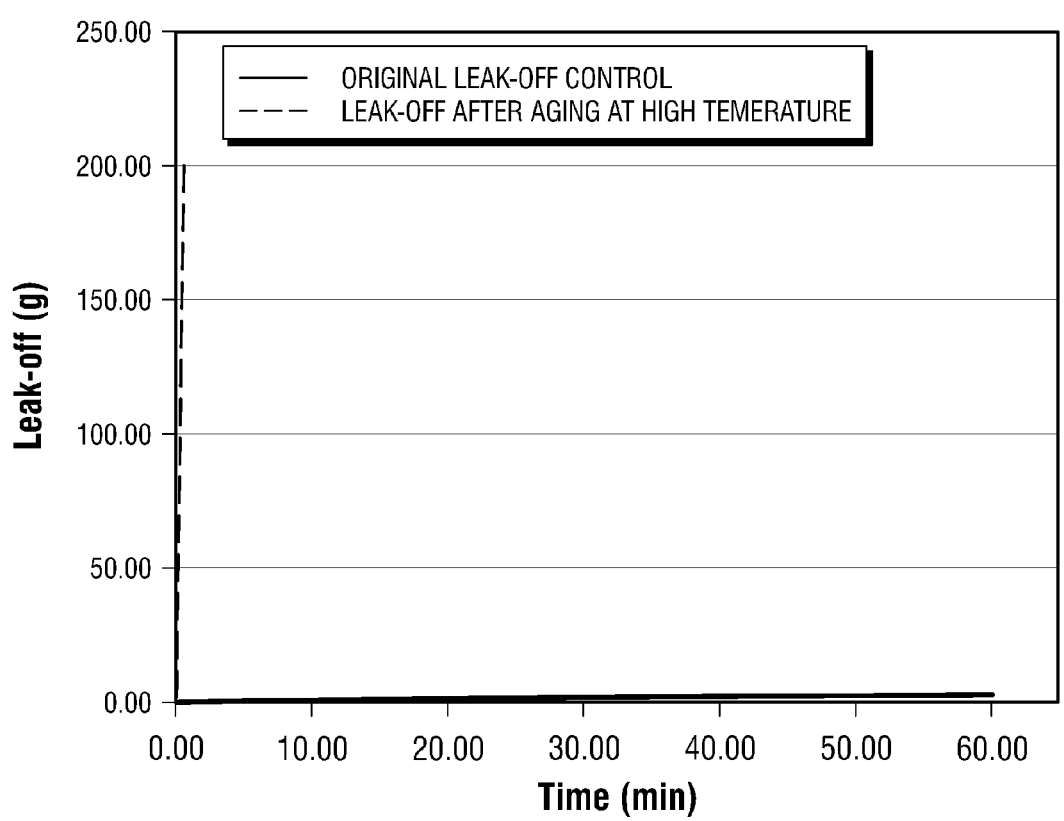
FIG. 5 is a leak-off plot for a degradable fluid formulation before and after thermal aging, according to an embodiment as discussed in Example 3.

The data are plotted in FIG. 5 as a function of the third particle size. The plot shows that the lowest leak-off rate at this concentration was obtained for the 58 μm third particles, establishing a range of the ratio of the second particle average size to that of the third particle of from about 2.0 to about 2.4, ideally about 2.18.

An approximate packing model for the particle size ratios according to one embodiment is seen in FIG. 6, which was obtained using the Descartes circle theorem. For four mutually tangent circles with curvatures, $P_n$, $P_{n+1}$, $P_{n+2}$, and $P_{n+3}$, the following equation (1) is applicable:

$$\frac{1}{P_n^2} + \frac{1}{P_{n+1}^2} + \frac{1}{P_{n+2}^2} + \frac{1}{P_{n+3}^2} = \frac{1}{2}\left(\frac{1}{P_n} + \frac{1}{P_{n+1}} + \frac{1}{P_{n+2}} + \frac{1}{P_{n+3}}\right)^2 \quad (1)$$

where $P_n$ is the curvature of circle n, where curvature is taken as the reciprocal of the radius. For example, when three equally sized spheres (Size P1=1) are touching each other, the size (diameter) ratio of P1/P2 can be obtained using the above equation to be 6.464~6.5. Similarly, the other ratios for the particle sizes required to stop leak-off in an embodiment can be estimated as P2/P3 being about 2.5 and P3/P4 being about 1.8, and when a fifth particle is used, P4/P5 is about 1.6. As a practical matter it can be difficult to obtain and/or work with particles having an average size range less than about 10 μm at the accuracy required, and one embodiment compensates by using a relatively large proportion of the fourth particle wherein the fourth particle has an average size between 10 and 20 μm.

Example 2

In this example the stability of a slurry was qualitatively observed by aging the slurry in a glass bottle under static conditions for 48 h in the temperature range of 66° C. (150° F.) to 121° C. (250° F.). At the end of 48 h, a pipette was manually inserted into the slurry to gauge the force required to stab into the slurry. This was a qualitative test and the force required to stab in was assigned a number from 0 to 5 with 0 being the worst case (cannot stab in) and 5 being the best case. After the stab-in test, the slurry was poured out of the bottle to check the flow properties and settling at the bottom of the slurry. The flowability was also assigned a number between 0 and 5, where 0 refers to not flowable and 5 refers to flowable slurry.

In Runs 2-1 to 2-3 a four-particle slurry as shown in Table 3 was evaluated at 66° C., 93° C. and 121° C. using diutan (0.036 wt %) as a viscosifier in the liquid phase.

TABLE 3

Slurry Compositions and Stability Results with Diutan Slurry Stabilizer

| Component/Property | Run 2-1 | Run 2-2 | Run 2-3 |
|---|---|---|---|
| Temperature, C. | 66 | 93 | 121 |
| CARBOLITE (20/40, 620 µm), g | 100 | 100 | 100 |
| Silica (200 µm), g | 12 | 12 | 12 |
| Silica (32 µm), g | 30 | 30 | 30 |
| Silica (3 µm), g | 32 | 32 | 32 |
| DI Water, g | 23 | 23 | 23 |
| Diutan, g | 0.008 | 0.008 | 0.008 |
| Slurry Stability Results, 64 h | | | |
| Stab-In, scale 0-5 | 5 | 5 | 5 |
| Flow, scale 0-5 | 4 | 4 | 4 |
| Settling | yes | yes | yes |

After 64 h at temperature, it was easy to stab-in a pipette into the slurry and also to pour the slurry out of the bottle. However, a sediment was observed in the bottle. In Run 14-4, a four-particle slurry as shown in Table 17 was evaluated at 121 C using nanometer sized γ-alumina (40 nm, obtained from Infarmat Advanced Materials) as a slurry stabilizer.

TABLE 4

Slurry Composition and Stability Result with γ-Alumina Slurry Stabilizer

| Component/Property | Run 14-4 |
|---|---|
| Temperature, C. | 121 |
| CARBOLITE (20/40, 620 µm), g | 100 |
| Silica (200 µm), g | 12 |
| Silica (32 µm), g | 30 |
| Silica (3 µm), g | 32 |
| DI Water, g | 26 |
| γ-Al2O3, g | 0.008 |
| Polynaphthalene sulfonate, ml | 0.17 |
| Slurry Stability Results, 86 h | |
| Stab-In, scale 0-5 | 5 |
| Flow, scale 0-5 | 5 |
| Free water | No |
| Settling | Little |

The stab-in, flow and free water results showed that the stability of the slurry was much better than that formulated with diutan. A unique property of slurries formulated with γ-alumina is that they do not have a layer of free water at the end of the experiment.

In Run 2-5, a four-particle slurry as shown in Table 5 was evaluated at 121° C. using gellan particles at 0.2 wt % and diutan at 0.036 wt %. At room temperature, the gellan particles dispersed easily in water but did not increase the viscosity of the mixture. At temperatures above 90° C., the gellan particles hydrate, increasing the viscosity of the solution. This is a very useful property in one embodiment because the particles can be added to the slurry at the surface without increasing the viscosity. After the slurry is placed downhole, the decrease in viscosity of liquid phase due to temperature can be compensated by the increase in viscosity due to hydration of gellan particles.

TABLE 5

Slurry Composition and Stability Result with Gellan/Diutan Slurry Stabilizer

| Component/Property | Run 2-5 |
|---|---|
| Temperature, C. | 121 |
| CARBOLITE (20/40, 620 µm), g | 100 |
| Silica (200 µm), g | 12 |
| Silica (32 µm), g | 30 |
| Silica (3 µm), g | 42 |
| DI Water, g | 28 |
| Diutan, g | 0.01 |
| Gellan gum, g | 0.06 |
| Slurry Stability Results, 86 h | |
| Stab-In, scale 0-5 | 5 |
| Flow, scale 0-5 | 5 |
| Free water | Yes |
| Settling | No |

The results in Table 5 showed that the slurry was stable and did not show settling at the end of the experiment.

In Runs 2-6, 2-7 and 2-8, the gellan/diutan, four-particle slurry of Table 5 was evaluated at different temperatures after 48 h as shown in Table 6.

TABLE 6

Stability Result with Gellan/Diutan Slurry Stabilizer

| Slurry Stability Results, 48 h | Run 2-6 | Run 2-7 | Run 2-8 |
|---|---|---|---|
| Temperature, ° C. | 66 | 93 | 121 |
| Stab-In, scale 0-5 | 5 | 5 | 5 |
| Flow, scale 0-5 | 5 | 5 | 5 |
| Free water | No | No | No |
| Settling | No | No | No |

The results in Table 6 showed that the slurry was stable when the fluid phase is viscosified at high temperature with gellan gum.

In Run 2-9, a four-particle slurry as shown in Table 7 was evaluated at 121° C. using polylactic acid (PLA) flakes to improve stability. The fluid phase of the slurry was not viscosified with diutan. The average size of the PLA flakes was around 1 mm.

TABLE 7

Slurry Composition and Stability Result with PLA Slurry Stabilizer

| Component/Property | Run 2-9 |
|---|---|
| Temperature, ° C. | 121 |
| CARBOLITE (20/40, 620 µm), g | 100 |
| Silica (200 µm), g | 12 |
| Silica (32 µm), g | 30 |
| Silica (3 µm), g | 32 |
| DI Water, g | 26 |
| PLA Flakes, g | 2 |
| Slurry Stability Results, 86 h | |
| Stab-In, scale 0-5 | 5 |
| Flow, scale 0-5 | 5 |
| Free water | Yes |
| Settling | Little |

The results in Table 7 showed that the addition of PLA flakes improved the stab-in, flow and settling properties of the slurry when compared to the stability results of the slurry formulated with diutan as shown in Table 3.

Example 3

The design of a high-solids slurry using a PLA fines emulsion for fluid loss control was investigated. The proppant was 40/70 mesh sand, and the intermediate particles were degradable polylactide (PLA) with PSD's of 45 and 90 microns. The PLA fines emulsion was a LANDY PL Series PL-2000 polylactide (NATUREWORKS biopolymer) resin emulsion for obtained commercially from Miyoshi Oil & Fat Co., Ltd., described as a 40 wt % solids emulsion of 2 μm PLA particles with a weakly anionic ionic character, viscosity 1000 mPa-s, normally used for coating and adhesive applications. The formulations included ANTAROX 31R1 surfactant (Rhodia), AMPS/acrylamide copolymer as a polymer viscosifier, polysiloxane defoaming agent, and fumed silica. Runs were prepared with and without 2 μm calcium carbonate fines, and with and without polynaphthalene sulfonate dispersant. Multimodal slurries were prepared using the compositions in Table 8. The ability of the slurry to inhibit leak-off into a screen under high differential pressure conditions was investigated. These experiments were conducted in a commercial high temperature, high pressure (HTHP) fluid loss cell by placing a ceramic disk having 10-μm openings at one end of the cell and loading the slurry on top of the disk. The leak-off tests were conducted by applying 3.45 MPa (500 psi) differential pressure with N2 gas for a period of 60 minutes at room temperature (24° C.). The rheological and leak off control properties are shown in Table 8.

TABLE 8

Slurry Composition and Spurt Results for Runs 3-1 to 3-3

| Component | Run 3-1 | Run 3-2 | Run 3-3 |
|---|---|---|---|
| 40/70 Mesh Sand (300 μm), g | 386.9 | 406 | 372.1 |
| PLA (90 μm), g | 47.9 | 53.9 | 49.4 |
| PLA (45 μm), g | 47.9 | 53.9 | 49.4 |
| CaCO3 (2 μm), g | 45.4 | 0 | 0 |
| PL-2000 40 wt % PLA Emulsion (2 μm), g | 35.2 | 35.2 | 59.4 |
| Polynaphthalene sulfonate, g | 1.2 | 1.2 | 0 |
| ANTAROX 31R1 Surfactant, g | 1.4 | 1.35 | 1.24 |
| AMPS/Acrylamide Copolymer (viscosifier), g | 4.6 | 4.6 | 5.15 |
| Polysiloxane (defoamer), g | 0.9 | 0.9 | 1 |
| Fumed silica, g | 9 | 9 | 20.2 |
| DI Water, g | 114 | 114 | 102.2 |
| Rheological Properties | | | |
| Free Fluid after 1 h, visual | little | little | little |
| Plastic Viscosity, mPa-s | 1250 | 1400 | 839 |
| Yield Stress, Pa | 8 | 8.8 | 15 |
| Leak-Off Control Properties | | | |
| Spurt, g | 0.56 | 1.08 | 0.91 |
| Leak Off (3.45 MPa, 30 min) | 2.58 | 2.9 | 2.2 |
| Leak Off (3.45 MPa, 60 min) | 3.38 | 3.7 | 2.78 |
| Clean-Up Properties | | | |
| Spurt, g | >200 | | |

All three fluids were stable as indicated by little free fluid after 1 hour of observation. Runs 3-1 and 3-2, prepared with CaCO3 particles and/or dispersant and less PLA emulsion and less fumed silica relative to Run 3-3, had similar rheological properties and leak off control properties, indicating that CaCO3 and/or dispersant may be optionally used. All runs had excellent stability, good rheological properties for downhole pumpability and very good leak-off control properties.

After performing the ambient temperature leak-off experiment in Run 3-1, the HTHP test cell was depressurized and heated to 121° C. (250° F.) to allow the PLA to degrade and the resultant acid to react with the calcium carbonate particles, leaving the porous sand pack. The system was cooled back to room temperature, and when the same pressure was applied to the fluid loss cell, the fluid quickly leaked off in less than one minute. This result indicates the fluid loss control agent, fines and smaller particles in this system are effectively removed at elevated temperature.

While the embodiments have been illustrated and described in detail in the drawings and foregoing description, the same is to be considered as illustrative and not restrictive in character, it being understood that only some embodiments have been shown and described and that all changes and modifications that come within the spirit of the embodiments are desired to be protected. It should be understood that while the use of words such as ideally, desirably, preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A method, comprising:
   mixing a treatment fluid comprising:
     a solids mixture having an Apollonianistic particle size distribution (PSD) comprising proppant slurried in a carrier fluid;
     a fluid loss control agent comprising an aqueous hydrolyzable polyester fines emulsion; and
     submicron particles comprising γ-alumina, MgO, γ-Fe2O3, TiO2, and combinations thereof;
   circulating the treatment fluid into a wellbore.

2. The method of claim 1, further comprising forming a pack of the solids downhole.

3. The method of claim 2, wherein the pack comprises proppant and at least one particle size distribution mode comprising degradable particles, and further comprising removing the degradable particles from the pack to form a permeable proppant pack.

4. The method of claim 3, further comprising producing or injecting a fluid through the permeable proppant pack.

5. The method of claim 3, wherein the degradable particles comprise a polymer or copolymer of lactic acid, glycolic acid, or the combination thereof.

6. The method of claim 3, wherein the permeable proppant pack comprises a gravel pack in an annulus between a screen and the wellbore.

7. The method of claim 3, wherein the permeable proppant pack is disposed in a fracture.

8. The method of claim 1, wherein the hydrolyzable polyester fines emulsion comprises polyester particles having a particle size distribution mode from about 0.1 to 20 microns.

9. The method of claim 1, wherein the hydrolyzable polyester fines emulsion comprises polyester particles and a surfactant.

10. The method of claim 1, wherein the solids mixture comprises an acid-reactive fines particle size distribution mode.

\* \* \* \* \*